US012347134B2

(12) United States Patent
Kim et al.

(10) Patent No.: US 12,347,134 B2
(45) Date of Patent: Jul. 1, 2025

(54) SERVER FOR POSE ESTIMATION AND OPERATING METHOD OF THE SERVER

(71) Applicant: Samsung Electronics Co., Ltd., Suwon-si (KR)

(72) Inventors: Yongsung Kim, Suwon-si (KR); Hyunsoo Choi, Suwon-si (KR); Daehyun Ban, Suwon-si (KR); Dongwan Lee, Suwon-si (KR); Juyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 17/963,419

(22) Filed: Oct. 11, 2022

(65) Prior Publication Data

US 2023/0169679 A1 Jun. 1, 2023

(30) Foreign Application Priority Data

Nov. 29, 2021 (KR) .......................... 10-2021-0167723

(51) Int. Cl.
*G06T 3/60* (2024.01)
*G06T 7/73* (2017.01)

(52) U.S. Cl.
CPC .................. *G06T 7/73* (2017.01); *G06T 3/60* (2013.01); *G06T 2207/20081* (2013.01); *G06T 2207/30196* (2013.01)

(58) Field of Classification Search
CPC ... G06T 7/73; G06T 3/60; G06T 2207/20081; G06T 2207/30196; G06T 7/75; G06T 7/11; G06T 7/187; G06T 7/20; G06V 40/20
See application file for complete search history.

(56) References Cited

U.S. PATENT DOCUMENTS

| | | | |
|---|---|---|---|
| 10,692,244 B2* | 6/2020 | Gu | .......................... G06T 7/579 |
| 2009/0232353 A1* | 9/2009 | Sundaresan | ............. G06T 7/251 |
| | | | 348/42 |
| 2021/0150764 A1* | 5/2021 | Kuo | ......................... G06T 7/73 |

FOREIGN PATENT DOCUMENTS

JP 2019-121045 A 7/2019

* cited by examiner

*Primary Examiner* — Siamak Harandi
(74) *Attorney, Agent, or Firm* — Jefferson IP Law, LLP

(57) ABSTRACT

A server for pose estimation of a person and an operating method of the server are provided. The operating method includes obtaining an original image including a person, generating a plurality of input images by rotating the original image, obtaining first pose estimation results respectively corresponding to the plurality of input images, by inputting the plurality of input images to a pose estimation model, applying weights to the first pose estimation results respectively corresponding to the plurality of input images, and obtaining a second pose estimation result, based on the first pose estimation results to which the weights are applied, wherein the first pose estimation results and the second pose estimation result each include data indicating main body parts of the person.

14 Claims, 17 Drawing Sheets

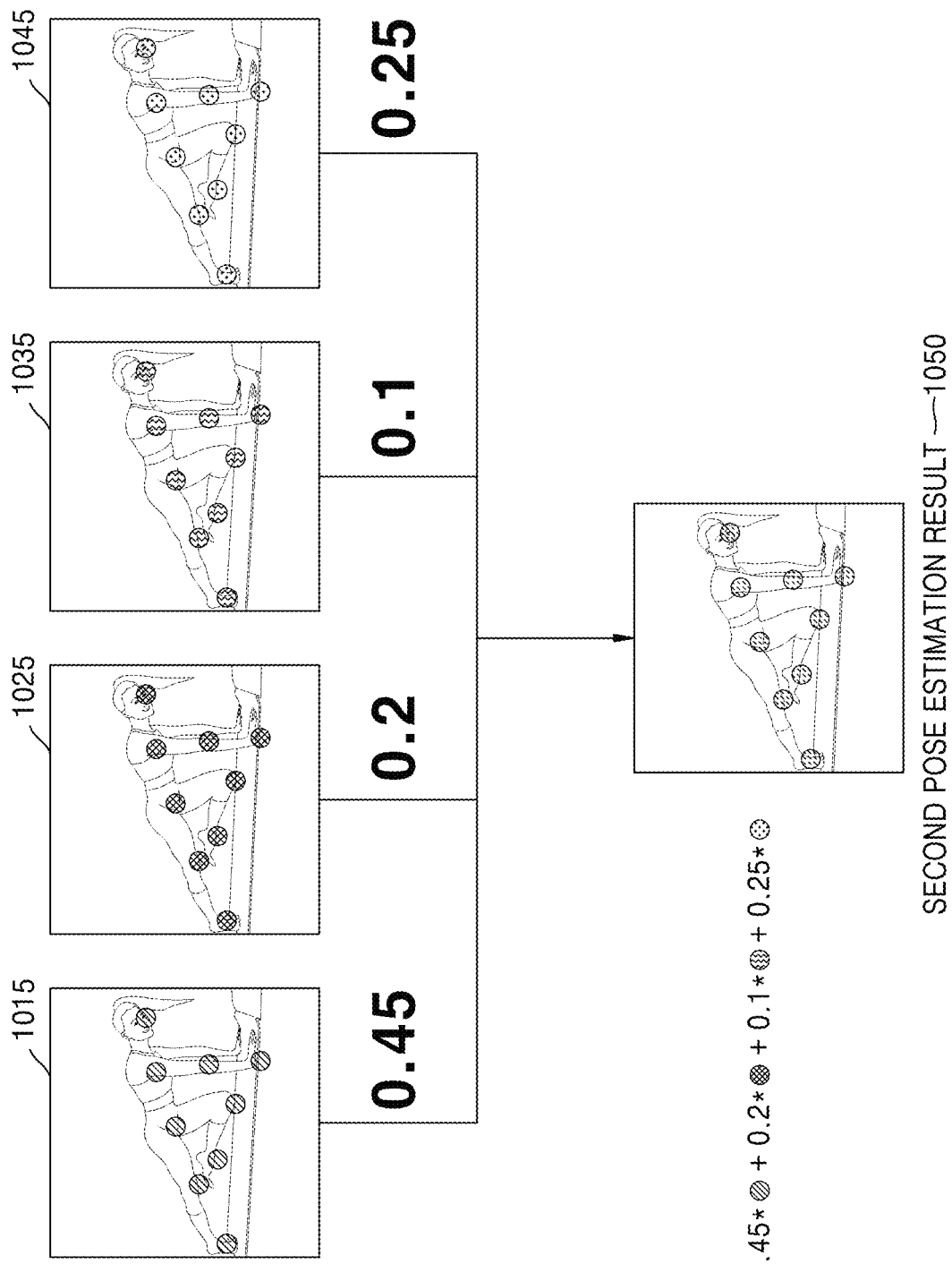

SERVER FOR POSE ESTIMATION AND OPERATING METHOD OF THE SERVER

CROSS-REFERENCE TO RELATED APPLICATION(S)

This application is based on and claims priority under 35 U.S.C. § 119(a) of a Korean patent application number 10-2021-0167723, filed on Nov. 29, 2021, in the Korean Intellectual Property Office, the disclosure of which is incorporated by reference herein in its entirety.

BACKGROUND

1. Field

The disclosure relates to a server for estimating a pose of a person in an image or a video and an operating method of the server.

2. Description of Related Art

When training is performed to process an image by using an artificial neural network, data augmentation for augmenting training data is used to improve the inference performance occurring in the artificial neural network. When a pose of a person is estimated, there is a limitation in collecting training data for various poses of people. Even in the case of an artificial neural network trained by using augmented data, pose estimation may not be accurate due to people whose pose changes in various ways.

In performing pose estimation by using a trained pose estimation model, a method for obtaining an accurate pose estimation result by generating a plurality of input images based on an original image and combining pose estimation results of the plurality of input images is provided.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server for obtaining a plurality of input images by augmenting an original image, performing pose estimation on the plurality of input images, and obtaining a pose estimation result with respect to the original image by combining a plurality of pose estimation results, and an operating method of the server.

Additional aspects will be set forth in part in the description which follows and, in part, will be apparent from the description, or may be learned by practice of the presented embodiments.

In accordance with an aspect of the disclosure, a method, performed by a server, of estimating a pose of a person is provided. The method includes obtaining an original image including a person, generating a plurality of input images by rotating the original image, obtaining first pose estimation results respectively corresponding to the plurality of input images, by inputting the plurality of input images to a pose estimation model, applying weights to the first pose estimation results respectively corresponding to the plurality of input images, and obtaining a second pose estimation result, based on the first pose estimation results to which the weights are applied, wherein the first pose estimation results and the second pose estimation result each include data indicating main body parts of the person.

The method may further include transmitting the original image and the second pose estimation result to another electronic device, to visually display the original image and the second pose estimation result.

The pose estimation model may be trained by using a training dataset including images including annotations indicating key points of a body.

The weights to be applied to the first pose estimation results may be determined based on an upper body inclination distribution of people included in the images of the training dataset used to train the pose estimation model.

The method may further include detecting head and pelvic joints of the person in the original image, and determining an upper body inclination of the person in the original image, based on the head and the pelvic joints.

The method may further include identifying an upper body inclination of the person in each of the plurality of input images, based on the upper body inclination of the person in the original image, wherein the applying of the weights to the first pose estimation results includes applying the weights to the first pose estimation results, based on the upper body inclination of the person in each of the plurality of input images, wherein the weights respectively correspond to the plurality of input images.

The generating of the plurality of input images may include determining the original image as a first image, generating a second image by rotating the original image clockwise by 90°, generating a third image by rotating the original image clockwise by 180°, and generating a fourth image by rotating the original image clockwise by 270°.

The obtaining of the first pose estimation results may include obtaining a first pose estimation result of the first image, obtaining a first pose estimation result of the second image, obtaining a first pose estimation result of the third image, and obtaining a first pose estimation result of the fourth image.

The method may further include identifying an upper body inclination of the person in each of the first image through the fourth image, wherein the applying of the weights to the first pose estimation results includes respectively applying a first weight through a fourth weight respectively corresponding to the upper body inclinations of the person in the first image through the fourth image. A sum of the first weight through the fourth weight may be 1.

In accordance with another aspect of the disclosure, a server for performing pose estimation of a person is provided. The server includes a communication interface, a memory storing one or more instructions, and a processor configured to execute the one or more instruction stored in the memory to obtain an original image including a person, generate a plurality of input images by rotating the original image, obtain first pose estimation results respectively corresponding to the plurality of input images, by inputting the plurality of input images to a pose estimation model, apply weights to the first pose estimation results respectively corresponding to the plurality of input images, and obtain a second pose estimation result, based on the first pose estimation results to which the weights are applied, wherein the first pose estimation results and the second pose estimation result each include data indicating main body parts of the person.

In accordance with another aspect of the disclosure, a non-transitory computer-readable recording medium having recorded thereon a program for executing any one of the methods causing the server to perform pose estimation of a person is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10C is a view for describing an operation by which a server applies weights to first pose estimation results of a plurality of input images, according to an embodiment of the disclosure;

The same reference numerals are used to represent the same elements throughout the drawings.

DETAILED DESCRIPTION

Figure 1:
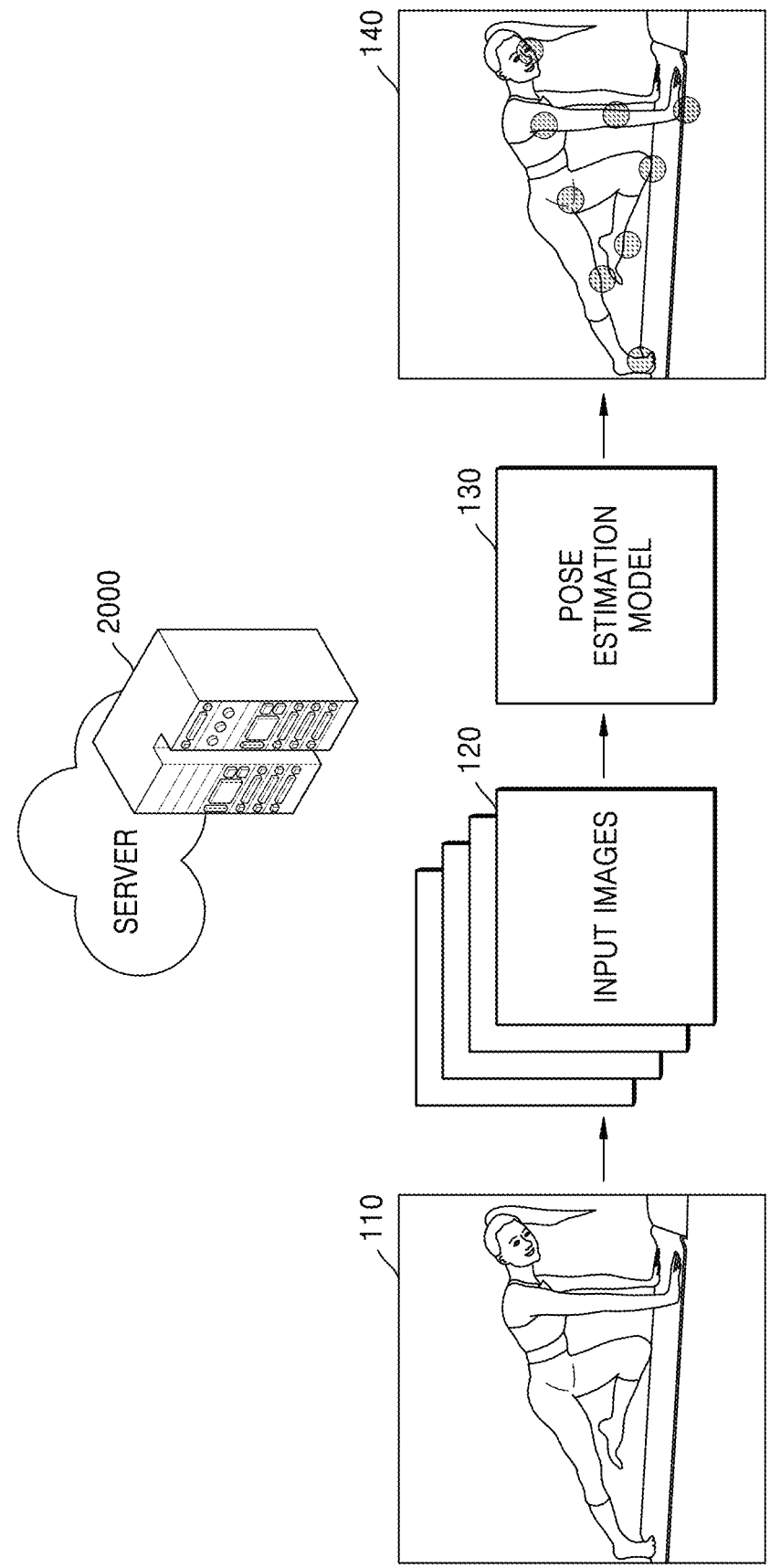
FIG. 1 is a view for schematically describing an operation by which a server estimates a pose of a person, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof. The terms used in the disclosure will be briefly described and the embodiments of the disclosure will be described in detail.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the applicant, and in this case, these terms are defined in detail below. Accordingly, the specific terms used herein should be defined based on the unique meanings thereof and the whole context of the disclosure.

Terms used herein, including technical or scientific terms, may have the same meaning as commonly understood by one of ordinary skill in the art described in the disclosure. It will be understood that, although the terms first, second, etc. may be used herein to describe various elements, these elements should not be limited by these terms. The above terms are used only to distinguish one component from another.

It will be understood that when a certain part "includes" a certain component, the part does not exclude another component but may further include another component, unless the context clearly dictates otherwise. Also, the term used in the embodiments such as " . . . unit" or " . . . module" indicates a unit for processing at least one function or operation, and may be implemented in hardware, software, or in a combination of hardware and software.

The disclosure will now be described more fully with reference to the accompanying drawings for one of ordinary skill in the art to be able to perform the disclosure without any difficulty. However, the disclosure may be embodied in many different forms and is not limited to the embodiments of the disclosure set forth herein. For clarity, portions irrelevant to the descriptions of the disclosure are omitted in the drawings, and like components are denoted by like reference numerals throughout the specification.

FIG. 1 is a view for schematically describing an operation by which a server estimates a pose of a person, according to an embodiment of the disclosure.

Referring to FIG. 1, a server 2000 according to an embodiment of the disclosure may obtain a pose estimation result 140 of a person in an original image 110 which is information indicating a pose of the person in the original image 110.

In the disclosure, a pose estimation result may include data indicating key points indicating main body parts of a person in an image, and the key points may be points indicating positions of, for example, the nose, head, ears, shoulders, elbows, wrists, hips, knees, and ankles in the image. The pose estimation result may be, for example, but is not limited to, coordinates in the image of the key points.

The server 2000 may generate a plurality of input images 120, by using the original image 110. The plurality of input images 120 that are images generated based on the original image refer to images obtained by changing a location, an angle, etc. of the person in the image in various ways while maintaining a pose of the person in the original image 110. The plurality of input images 120 may be generated by applying a data augmentation method (e.g., rotation or flip) to the original image 110.

The server 2000 may input the plurality of input images 120 to a pose estimation model 130. In this case, each of the plurality of input images 120 is individually input to the pose estimation model 130. For example, the server 2000 may input a first input image to the pose estimation model 130 and may estimate a pose of the person in the first input image, and may input a second input image to the pose estimation model 130 and may estimate a pose of the person in the second input image.

The server 2000 may obtain the pose estimation result 140 of the person in the original image 110, by combining pose estimation results obtained by applying the plurality of input images 120 to the pose estimation model 130. In the disclosure, a pose estimation result obtained by inputting one of the input images 120 to the pose estimation model 130 is referred to as a first pose estimation result. The server 2000 may obtain the pose estimation result 140 of the person in the original image 110, by combining first pose estimation results obtained by applying the input images to the pose estimation model 130. In this case, the server 2000 may apply a weight to each of the first pose estimation results.

That is, the server 2000 may obtain first pose estimation results by using the pose estimation model 130, for the plurality of input images 120 in which various changes are made while a pose of the person in the original image 110 is maintained, and then may obtain the pose estimation result 140 of the person in the original image 110 based on the first pose estimation results by using post-processing algorithms described below.

In the disclosure, the pose estimation result 140 of the person in the original image 110, obtained by combining the first pose estimation results, is referred to as a second pose estimation result.

Figure 2:
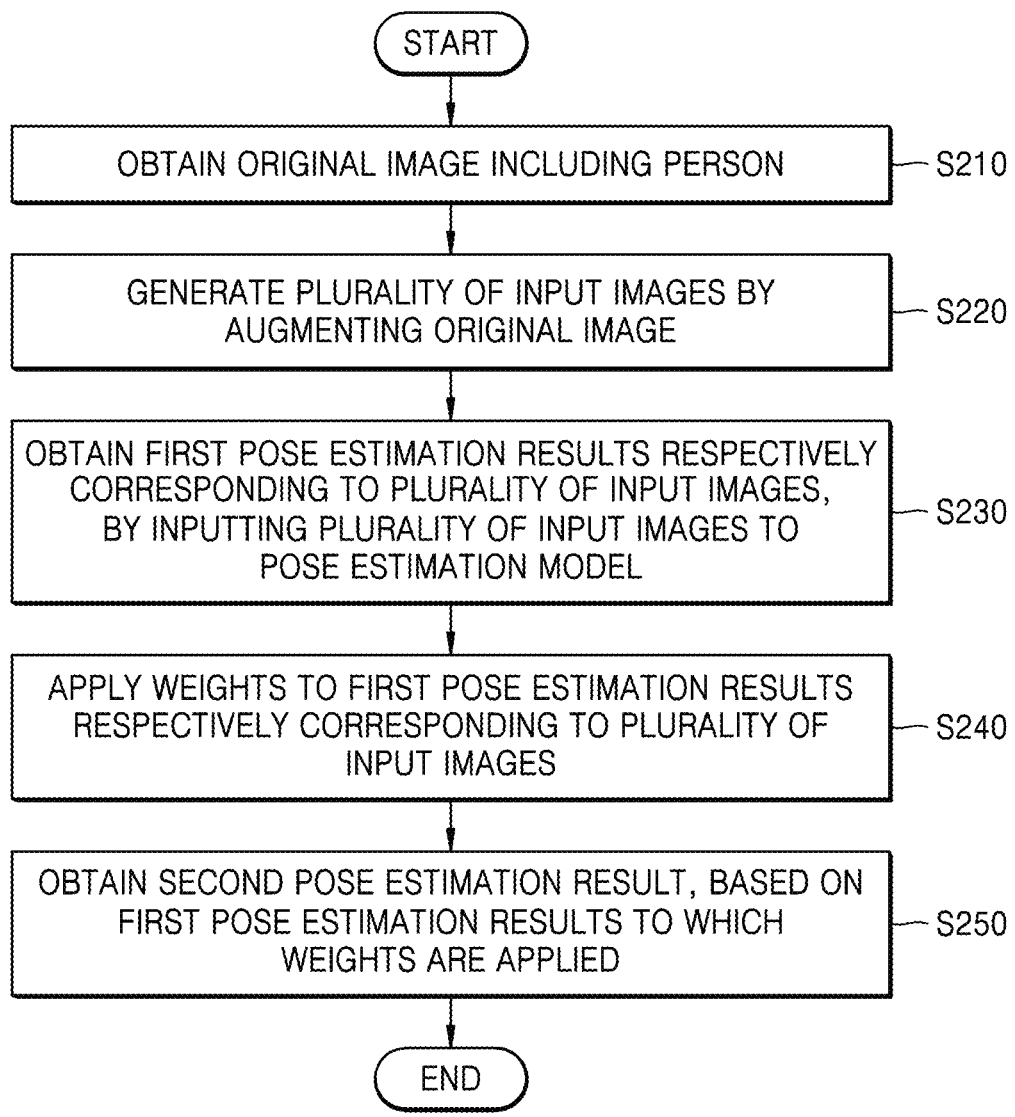
FIG. 2 is a flowchart illustrating a method by which a server estimates a pose of a person, according to an embodiment of the disclosure.

FIG. 2 is a flowchart illustrating a method by which a server estimates a pose of a person, according to an embodiment of the disclosure.

Referring to FIG. 2, in operation S210, the server 2000 according to an embodiment of the disclosure obtains an original image including a person.

In an embodiment of the disclosure, the server 2000 may obtain the original image including the person stored in a memory of the server 2000, or may obtain the original image including the person from another electronic device (e.g., a smartphone).

In an embodiment of the disclosure, pose estimation performed by the server 2000 may also be applied to a video. In this case, the original image including the person may be a frame image constituting the video including the person. The server 2000 may perform pose estimation on each frame of the video. For convenience of explanation, the following will be described assuming that the server 2000 estimates a pose in an image.

In operation S220, the server 2000 according to an embodiment of the disclosure generates a plurality of input images by augmenting the original image.

In an embodiment of the disclosure, the following will be described assuming that the number of input images is 4. However, the number of input images is merely an example for convenience of explanation, and the plurality of input images refer to two or more images.

The server 2000 may augment an image by using any of various data augmentation methods. Examples of the data augmentation method may include, but are not limited to, rotation, flip, and translation of the image.

In an embodiment of the disclosure, the server 2000 may generate a plurality of input images by rotating the original image. For example, the server 2000 may generate four input images including the original image and images obtained by rotating the original image clockwise (or counterclockwise) by 90°, 180°, and 270°. However, an angle by which the original image is rotated and the number of input images are merely examples, and the server 2000 may generate images obtained by rotating the original image by different angles (e.g., 30° and 45°) as input images. In this case, the server 2000 may process the rotated original image through padding and/or cropping into input images. For example, when an input image input to a pose estimation model has a size of N×N, the server 2000 may process the original image rotated by 30° through padding and/or cropping into a size of N×N.

In an embodiment of the disclosure, the server 2000 may generate a plurality of input images by flipping the original image. For example, the server 2000 may generate four input images including the original image and images obtained by flipping the original image in a left-right direction, an up-down direction, and an up-down-left-right direction.

In an embodiment of the disclosure, the server 2000 may generate a plurality of input images, by processing the original image through at least two of data augmentation methods such as rotation, flip, and translation.

In operation S230, the server 2000 according to an embodiment of the disclosure obtains first pose estimation results respectively corresponding to the plurality of input images, by inputting the plurality of input images to the pose estimation model.

In an embodiment of the disclosure, a pose estimation result may include data indicating key points of main body parts of a person in an image. Also, a first pose estimation result refers to a pose estimation result obtained by applying an input image to a pose estimation model, and a second pose estimation result refers to a pose estimation result, generated based on first pose estimation results obtained from a plurality of input images.

In an embodiment of the disclosure, the plurality of input images may include, for example, four images including a first image, a second image, a third image, and a fourth image. The server 2000 may obtain a first pose estimation result corresponding to the first image by inputting the first image to the pose estimation model, may obtain a first pose estimation result corresponding to the second image by inputting the second image to the pose estimation model, may obtain a first pose estimation result corresponding to the third image by inputting the third image to the pose estimation model, and may obtain a first pose estimation result corresponding to the fourth image by inputting the fourth image to the pose estimation model. That is, the server 2000 may obtain first pose estimation results, respectively corresponding to the first image through the fourth image.

In operation S240, the server 2000 according to an embodiment of the disclosure applies weights to the first pose estimation results respectively corresponding to the plurality of input images.

In an embodiment of the disclosure, the server 2000 may determine weights to be applied to the first pose estimation results. The server 2000 may identify an upper body inclination of a person in each of images of a training dataset used to train the pose estimation model, and may obtain an upper body inclination distribution. The server 2000 may determine weights based on the upper body inclination distribution in the images of the training dataset. For example, the server 2000 may determine a first weight based on a ratio of images in which an upper body inclination in the training dataset ranges from 0° to 90°, may determine a second weight based on a ratio of images in which an upper body inclination in the training dataset ranges from 90° to 180°, may determine a third weight based on a ratio of images in which an upper body inclination in the training dataset ranges from 180° to 270°, and may determine a fourth weight based on a ratio of images in which an upper body inclination in the training dataset ranges from 270° to 360°.

A method by which the server 2000 determines weights based on the mages of the training dataset will be described below in more detail.

The server 2000 according to an embodiment of the disclosure may apply the determined weights, to the first pose estimation results of the plurality of images. The determined weights respectively correspond to the first pose estimation results. The server 2000 may determine which weight corresponds a first pose estimation result of which input image. For example, as a result of the server 2000 determining whether the first pose estimation results correspond to the weights, the first weight may correspond to the first pose estimation result of the first image, the second weight may correspond to the first pose estimation result of the second image, the third weight may correspond to the first pose estimation result of the third image, and the fourth weight may correspond to the first pose estimation result of the fourth image. However, this is merely an example for convenience of explanation. That is, the first weight may not necessarily correspond to the pose estimation result of the first mage, and in another example, the second weight may correspond to the pose estimation result of the first image. A specific method by which the server 2000 determines which weight corresponds to a first pose estimation result of which input image will be described below in more detail. The server 2000 may respectively apply the weights to the first pose estimation results.

In operation S250, the server 2000 according to an embodiment of the disclosure obtains a second pose estimation result, based on the first pose estimation results to which the weights are applied.

In an embodiment of the disclosure, the server 2000 may obtain the second pose estimation result, by adding the first pose estimation results to which the weights are applied. In the example of operation S240, the server 2000 may add the first pose estimation result of the first image to which the first weight is applied, the first pose estimation result of the second image to which the second weight is applied, the first pose estimation result of the third image to which the third weight is applied, and the first pose estimation result of the fourth image to which the fourth weight is applied.

Figure 3:
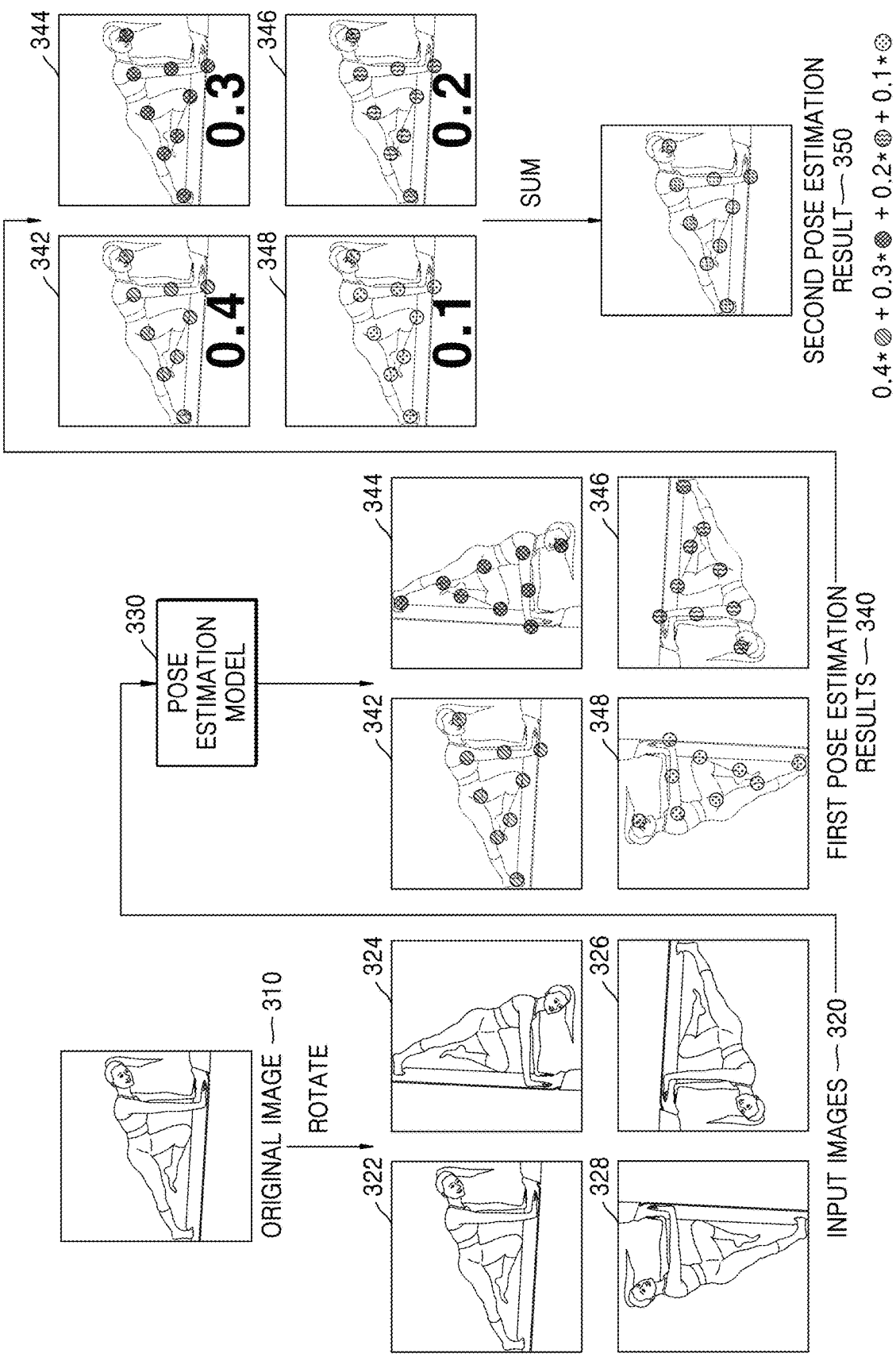
FIG. 3 is a view for describing an operation by which a server obtains a pose estimation result, according to an embodiment of the disclosure.

FIG. 3 is a view for describing an operation by which a server obtains a pose estimation result, according to an embodiment of the disclosure.

Referring to FIG. 3, the server 2000 according to an embodiment of the disclosure may generate a plurality of input images 320, by augmenting an original image 310.

Referring to FIG. 3, the following will be described assuming that an image augmentation method is image rotation. The plurality of input images 320 generated by the server 2000 may include a first image 322, a second image 324, a third image 326, and a fourth image 328. In this case, the first image 322 may be the original image 310, the second image 324 may be an image obtained by rotating the original image 310 clockwise by 90°, the third image 326 may be an image obtained by rotating the original image 310 clockwise by 180°, and the fourth image 328 may be an image obtained by rotating the original image 310 clockwise by 270°.

The server 2000 may obtain first pose estimation results 340 respectively corresponding to the plurality of input images 320, by inputting the plurality of input images 320 to a pose estimation model 330. A first pose estimation result may be data indicating key points indicating main body parts of a person in an image. For example, the server 2000 may obtain a first pose estimation result 342 of the first image 322 by inputting the first image 322 to the pose estimation model 330, may obtain a first pose estimation result 344 of the second image 324 by inputting the second image 324 to the pose estimation model 330, may obtain a first pose estimation result 346 of the third image 326 by inputting the third image 326 to the pose estimation model 330, and may obtain a first pose estimation result 348 of the fourth image 328 by inputting the fourth image 328 to the pose estimation model 330.

The server 2000 may reversely apply the data augmentation method applied by the server 2000 to generate the plurality of input images 320, to the first pose estimation results 340. Accordingly, the first pose estimation results 340 may be restored to correspond to the original image 310. For example, because the first pose estimation result 342 of the first image corresponds to the original image 310, the server 2000 may not change the first pose estimation result 342. Also, the server 2000 may restore the first pose estimation results 340 to correspond to the original image 310, by rotating the first pose estimation result 344 of the second image 324 counterclockwise by 90°, rotating the first pose estimation result 346 of the third image 326 counterclockwise by 180°, and rotating the first pose estimation result 348 of the fourth image 328 counterclockwise by 270°.

The server 2000 may restore the first pose estimation results 340 to correspond to the original image 310, and then may apply weights. A weight may be a value pre-determined by the server 2000, or there may be a weight corresponding to each of the first pose estimation results 340. For example, a weight corresponding to the first pose estimation result 342 of the first image 322 may be 0.4, a weight corresponding to the first pose estimation result 344 of the second image 324 may be 0.32, a weight corresponding to the first pose estimation result 346 of the third image 326 may be 0.2, and a weight corresponding to the first pose estimation result 348 of the fourth image 328 may be 0.1. The server 2000 may obtain a second pose estimation result 350, by adding the first pose estimation results to which the weights are applied.

Figure 4A:
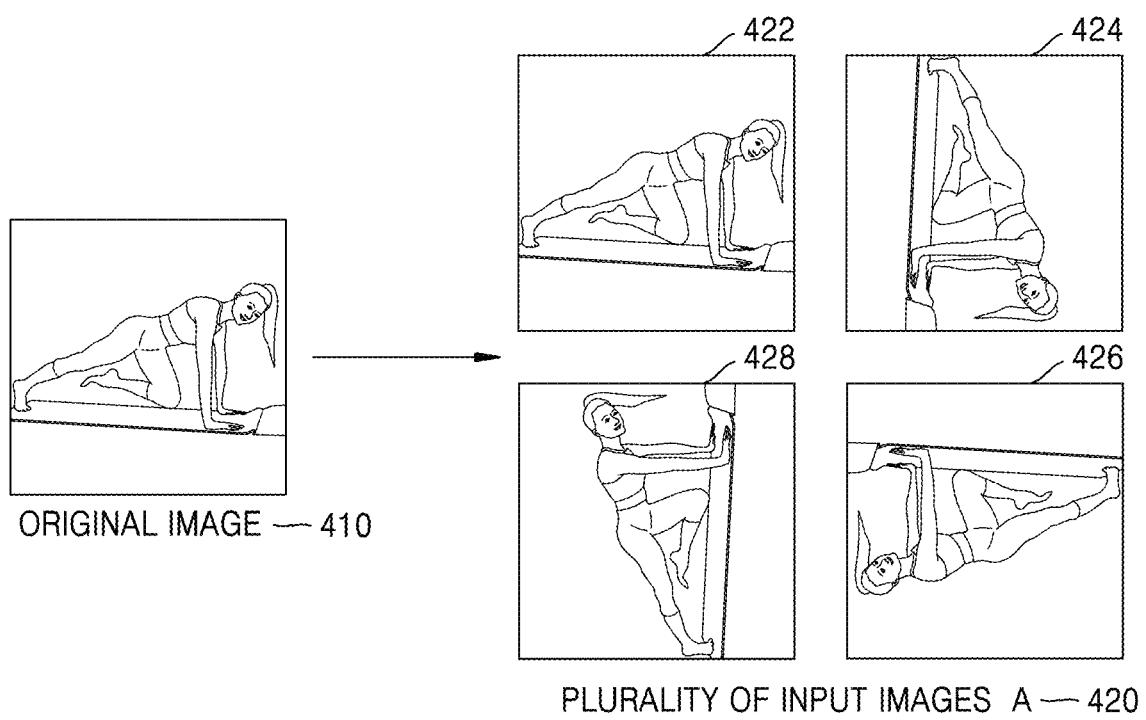
FIG. 4A is a view for describing an example in which a server generates a plurality of input images by augmenting an original image, according to an embodiment of the disclosure.

FIG. 4A is a view for describing an example in which a server generates a plurality of input images by augmenting an original image, according to an embodiment of the disclosure.

Referring to FIG. 4A, in an embodiment of the disclosure, the server 2000 may generate a plurality of input images A 420, by rotating an original image 410.

The plurality of input images A 420 generated by the server 2000 may include a first image A 422, a second image A 424, a third image A 426, and a fourth image A 428. In this case, the first image A 422 may be the original image 410, the second image A 424 may be an image obtained by rotating the original image 410 clockwise by 90°, the third image A 426 may be an image obtained by rotating the original image 410 clockwise by 180°, and the fourth image A 428 may be an image obtained by rotating the original image 410 clockwise by 270°.

The plurality of input images A 420 may be input to a pose estimation model to be converted into first pose estimation results.

Figure 4B:
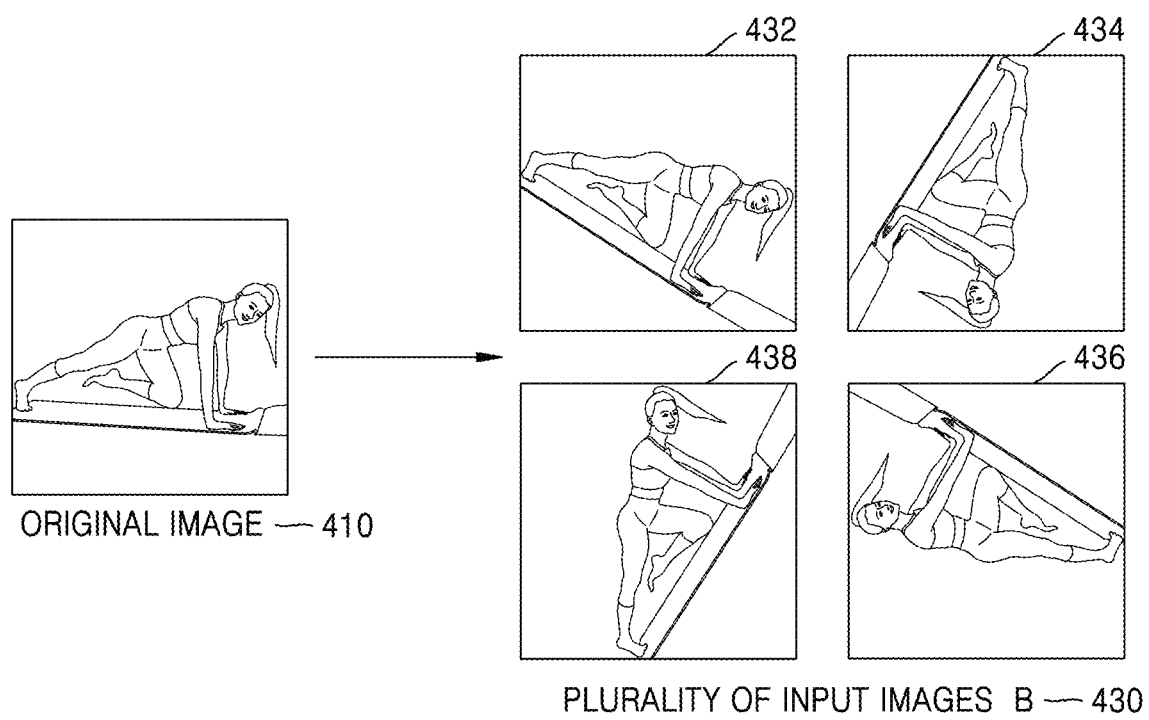
FIG. 4B is a view for describing another example in which a server generates a plurality of input images by augmenting an original image, according to an embodiment of the disclosure.

FIG. 4B is a view for describing another example in which a server generates a plurality of input images by augmenting an original image, according to an embodiment of the disclosure.

Referring to FIG. 4B, in an embodiment of the disclosure, the server 2000 may generate a plurality of input images B 430, by rotating the original image 410 in a manner different from that of FIG. 4A.

The plurality of input images B 430 generated by the server 2000 may include a first image B 432, a second image B 434, a third image B 436, and a fourth image B 438. In this case, the first image B 432 may be an image obtained by rotating the original image 410 clockwise by 30°, the second image B 434 may be an image obtained by rotating the original image 410 clockwise by 120°, the third image B 436 may be an image obtained by rotating the original image 410 clockwise by 210°, and the fourth image B 438 may be an image obtained by rotating the original image 410 clockwise by 300°.

In this case, the server 2000 may pad and/or crop the first image B 432 through the fourth image B 438 that are rotated images. For example, when an input image input to a pose estimation model has a size of N×N, the server 2000 may generate the first image B 432 by cropping portions outside a frame having a size of N×N when the original image 410 is rotated by 30°, and padding portions with no pixel values inside the frame having the size of N×N when the original image 410 is rotated by 30°.

The plurality of input images B 430 may be input to the pose estimation model to be converted into first pose estimation results.

Figure 4C:
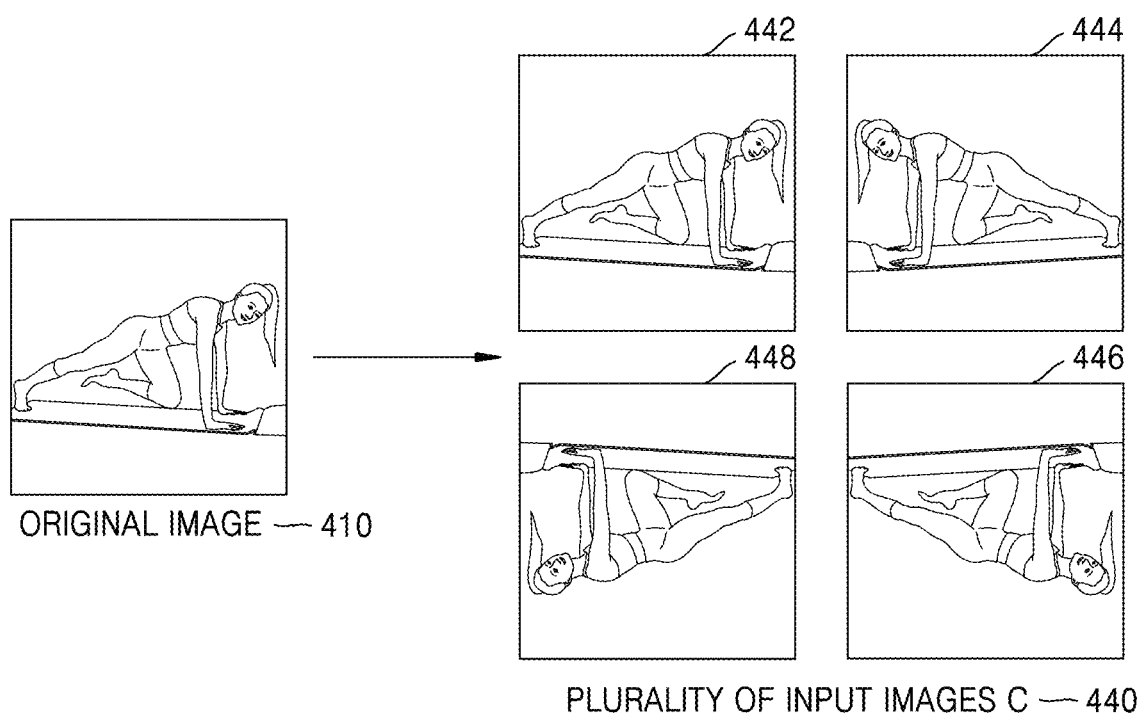
FIG. 4C is a view for describing another example in which a server generates a plurality of input images by augmenting an original image, according to an embodiment of the disclosure.

FIG. 4C is a view for describing another example in which a server generates a plurality of input images by augmenting an original image, according to an embodiment of the disclosure.

Referring to FIG. 4C, in an embodiment of the disclosure, the server 2000 may generate a plurality of input images C 440, by flipping the original image 410.

The plurality of input images C 440 generated by the server 2000 may include a first image C 442, a second image C 444, a third image C 446, and a fourth image C 448. In this case, the first image C 442 may be the original image 410, the second image C 444 may be an image by flipping the original image 410 in a left-right direction, the third image C 446 may be an image obtained by flipping the original image 410 in an up-down direction, and the fourth image C 448 may be an image obtained by flipping the original image 410 in an up-down-left-right direction.

The plurality of input images C 440 may be input to the pose estimation model to be converted into first pose estimation results.

Examples in which the server 2000 generates a plurality of input images by augmenting the original image 410 have been described with reference to FIGS. 4A to 4C. However, a data augmentation method and the number of input images are not limited thereto. The server 2000 may generate a plurality of input images to be input to the pose estimation model by using any of various data augmentation methods.

Figure 5A:
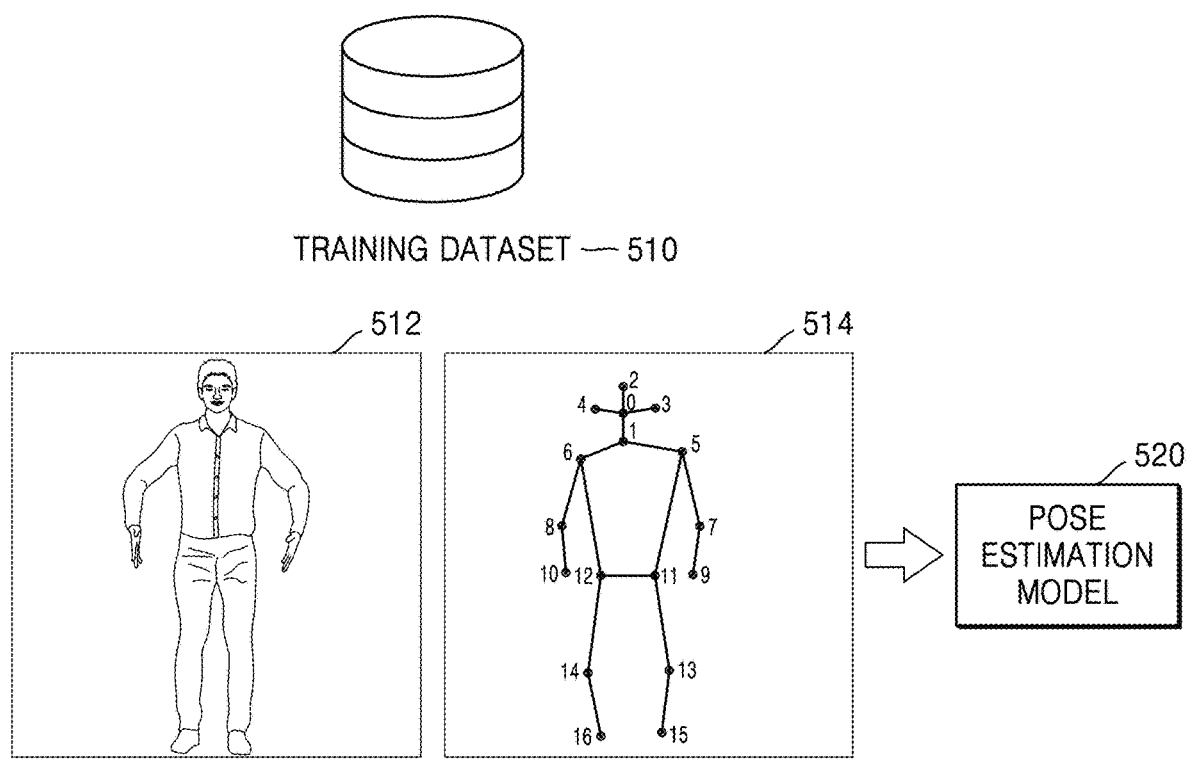
FIG. 5A is a view for describing training of a pose estimation model used by a server for pose estimation, according to an embodiment of the disclosure.

FIG. 5A is a view for describing training of a pose estimation model used by a server for pose estimation, according to an embodiment of the disclosure.

Referring to FIG. 5A, the server 2000 may train a pose estimation model 520 by using a training dataset 510.

The training dataset 510 may include a plurality of images each including a person. An image 512 included in the training dataset 510 may include annotations 514 indicating key points of a body.

Training of the pose estimation model 520 may be performed by using various known artificial intelligence (AI) algorithms. For example, the server 2000 may train the pose estimation model 520 by using a top-down algorithm of detecting a person in an image and detecting key points of a body in a detected bounding box to estimate a pose of the person. In another example, the server 2000 may train the pose estimation model 520 by using a bottom-up algorithm of detecting key points of a body of a person included in an image and analyzing a relationship between the key points to estimate a pose of the person.

However, a pose estimation algorithm is not limited to those described above, and embodiments of the disclosure are described assuming that pose estimation results obtained by using a pose estimation model are key points.

Figure 5B:
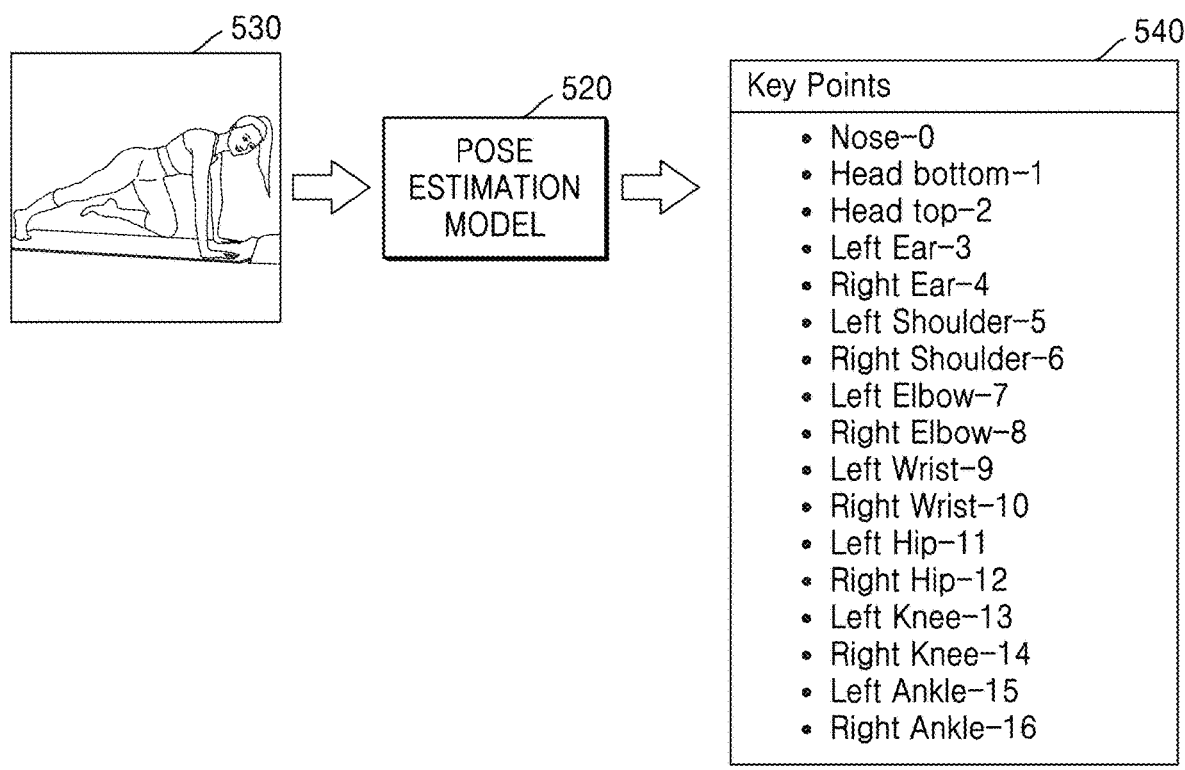
FIG. 5B is a view for describing inference of a pose estimation model used by a server for pose estimation, according to an embodiment of the disclosure.

FIG. 5B is a view for describing inference of a pose estimation model used by a server for pose estimation, according to an embodiment of the disclosure.

Referring to FIG. 5B, the server 2000 may obtain a pose estimation result 540, by applying an input image 530 to a pose estimation model 520. The pose estimation result 540 may be key points indicating main body parts of a person in an image. The key points may include the nose, head, ears, shoulders, elbows, wrists, hips, knees, and ankles. The pose estimation result 540 may be, for example, but is not limited to, coordinates in the image of the key points. The server 2000 may estimate a pose of the person in the image, based on the pose estimation result 540. For example, the server 2000 may generate a skeleton representing a pose of the person by connecting the key points, and may estimate a pose of the person based on the generated skeleton.

In an embodiment of the disclosure, the input image 530 applied by the server 2000 to the pose estimation model 520 is an original image and the pose estimation result 540 that is a final result obtained by the server 2000 from the pose estimation model 520 is a second pose estimation result, but intermediate processes are omitted for convenience of explanation. The server 2000 may generate a plurality of input images by augmenting the input image 530 that is an original image, may obtain a plurality of first pose estimation results by applying the plurality of input images to the pose estimation model 520, and may obtain the pose estimation result 540 that is a second pose estimation result by combining the plurality of first pose estimation results.

Figure 6:
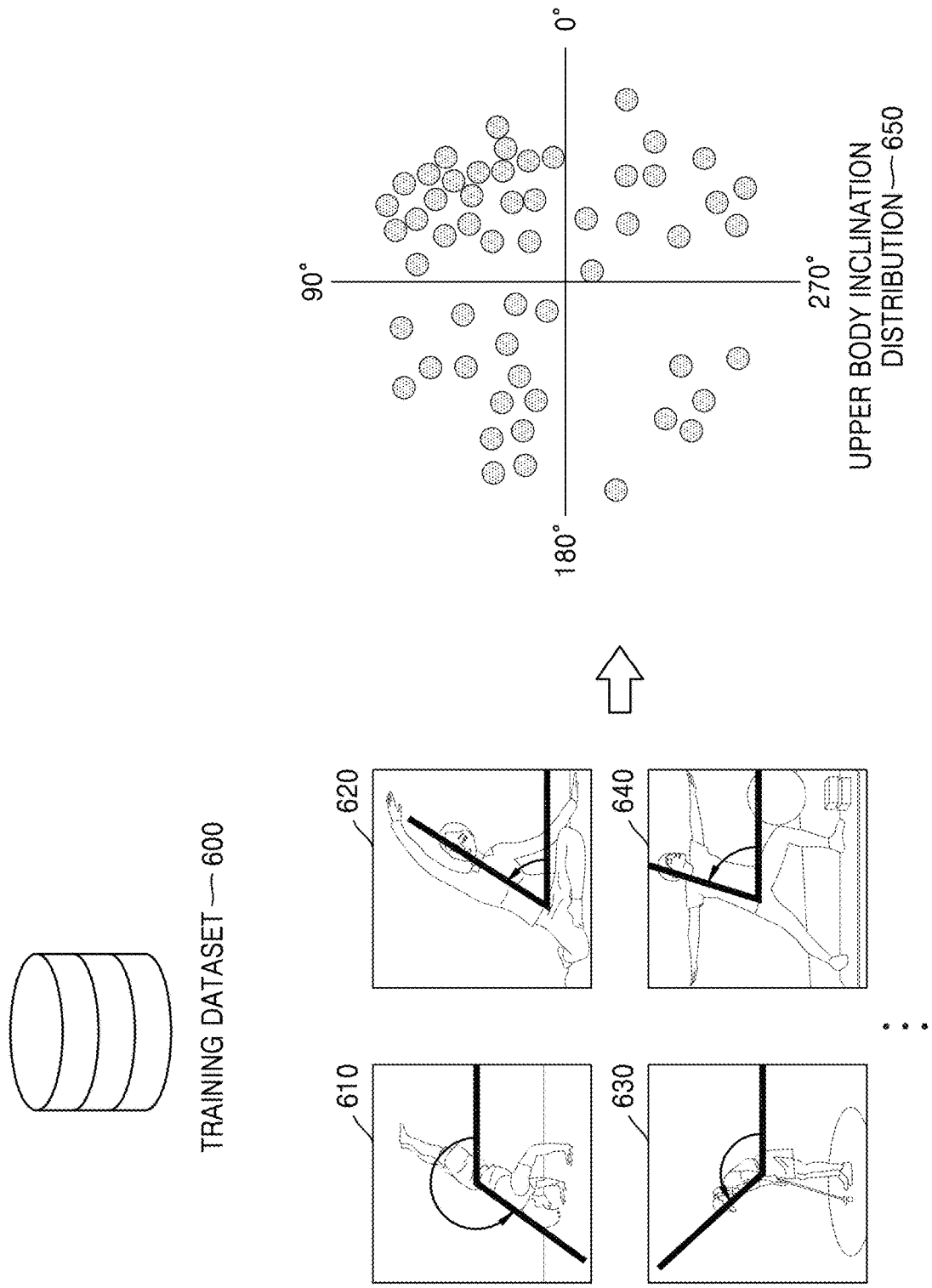
FIG. 6 is a view for describing a part of an operation by which a server applies weights to be applied to first pose estimation results, according to an embodiment of the disclosure.

FIG. 6 is a view for describing a part of an operation by which a server applies weights to be applied to first pose estimation results, according to an embodiment of the disclosure.

Referring to FIG. 6, the server 2000 may identify an upper body inclination of a person in each of images included in a training dataset 600 used to train a pose estimation model. The server 2000 may detect the head and pelvic joints of the person in the image, and may identify the upper body inclination of the person of the image by connecting the head and pelvic joints. The server 2000 may obtain an upper body inclination distribution 650 in the images of the training dataset 9600, by identifying the upper body inclination of the person for each of the images included in the training dataset 600.

The upper body inclination distribution 650 may include information about a length and an inclination (angle) of the upper body of the person included in the image.

As a result of the server 2000 identifying an upper body inclination of a person in a first training image 610 included in the training dataset 600, the upper body inclination of the person in the first training image 610 ranges from 180° to 270°. Also, an upper body inclination of a person in a second training image 620 and a fourth training image 640 ranges from 0° to 90°, and an upper body inclination of a person in a third training image 630 ranges from 90° to 180°. The server 2000 may obtain the upper body inclination distribution 650, by identifying upper body inclinations of people in training images included in the training dataset 600 in the same manner. When the upper body inclination distribution 650 is represented as a graph, it may be found that each of the training images is included in any one of quadrants of the graph according to a length and an inclination of the upper body.

Figure 7:
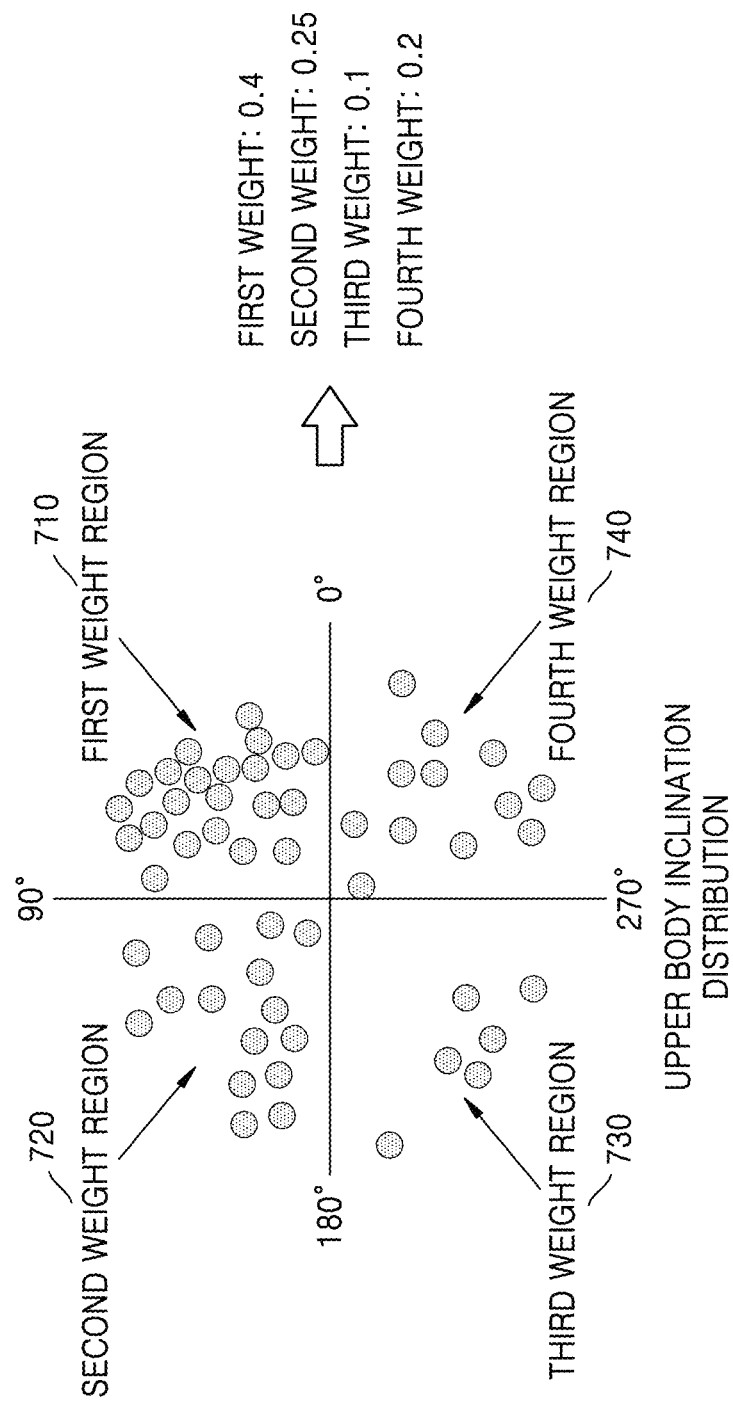
FIG. 7 is a diagram for describing a remaining part of an operation by which a server applies weights to be applied to first pose estimation results, according to an embodiment of the disclosure.

FIG. 7 is a diagram for describing a remaining part of a process by which a server applies weights to be applied to first pose estimation results, according to an embodiment of the disclosure.

In an embodiment of the disclosure, the server 2000 may determine weights to be applied to first estimation results, based on an upper body inclination distribution of people included in images of an obtained training dataset.

In an embodiment of the disclosure, because a pose estimation model is a model trained based on the images of the training dataset, the performance of the pose estimation model may vary according to the upper body inclination distribution of people included in the images of the training dataset. For example, most of the images of the training dataset may have an upper body inclination ranging from 0° to 90°. In this case, the pose estimation model may accurately estimate a pose for an input image in which an upper body inclination of a person ranges from 0° to 90°, but may not accurately estimate a pose for an input image in which an upper body inclination of a person does not range from 0° to 90°. Accordingly, the server 2000 may use a training dataset used to train the pose estimation model to obtain an upper body inclination distribution of people included in images of the training dataset, and may determine weights to be applied to first estimation results.

In an embodiment of the disclosure, the server 2000 may divide an upper body inclination distribution into a plurality of weight regions, to set different weights according to an upper body inclination. For example, referring to FIG. 7, the server 2000 may divide a region in which an inclination ranges from 0° to 90° as a first weight region 710, may divide a region in which an inclination ranges from 90° to 180° as a second weight region 720, may divide a region in which an inclination ranges from 180° to 270° as a third weight region 730, and may divide a region in which an inclination ranges from 270° to 360° as a fourth weight region 740.

The server 2000 may determine weights, based on a ratio of training images included in each weight region from among images included in a training dataset. For example, from among the images included in the training dataset, a ratio of training images included in the first weight region 710 because an upper body inclination of a person in an image ranges from 0° to 90° may be 40%. In this case, the server 2000 may determine a first weight to be 0.4. Also, from among the images included in the training dataset, a ratio of training images included in the second weight region 720 because an upper body inclination of a person in an image ranges from 90° to 180° may be 25%. In this case, the server 2000 may determine a second weight to be 0.25. Also, from among the images included in the training dataset, a ratio of training images included in the third weight region 730 because an upper body inclination of a person in an image ranges from 180° to 270° may be 10%. In this case, the server 2000 may determine a third weight to be 0.1. Also, from among the images included in the training dataset, a ratio of training images included in the fourth weight region 740 because an upper body inclination of a person in an image ranges from 270° to 360° may be 20%. In this case, the server 2000 may determine a fourth weight to be 0.2.

In an embodiment of the disclosure, the server 2000 may divide an inclination distribution into a plurality of weight regions by further reflecting an upper body length, to set different weights according to an upper body inclination and an upper body length. In the first weight region 710, a region in which an upper body length is less than a certain value may be divided as a $1\text{-}1^{st}$ weight region, and a region in which an upper body length is greater than the certain value may be divided as a $1\text{-}2^{nd}$ weight region. In the same manner, the server 2000 may set a $2\text{-}1^{st}$ weight region, a $2\text{-}2^{nd}$ weight region, a $3\text{-}1^{st}$ weight region, a $3\text{-}2^{nd}$ weight region, a $4\text{-}1^{st}$ weight region, and a $4\text{-}2^{nd}$ weight region, based on an upper body length. The server 2000 may determine weights, based on a ratio of training images included in each weight region, from among training images in a training dataset, which has been described above, and thus, the same description will be omitted.

The server 2000 according to an embodiment of the disclosure may apply the determined weights to the first estimation results generated from the plurality of input images.

Figure 8:
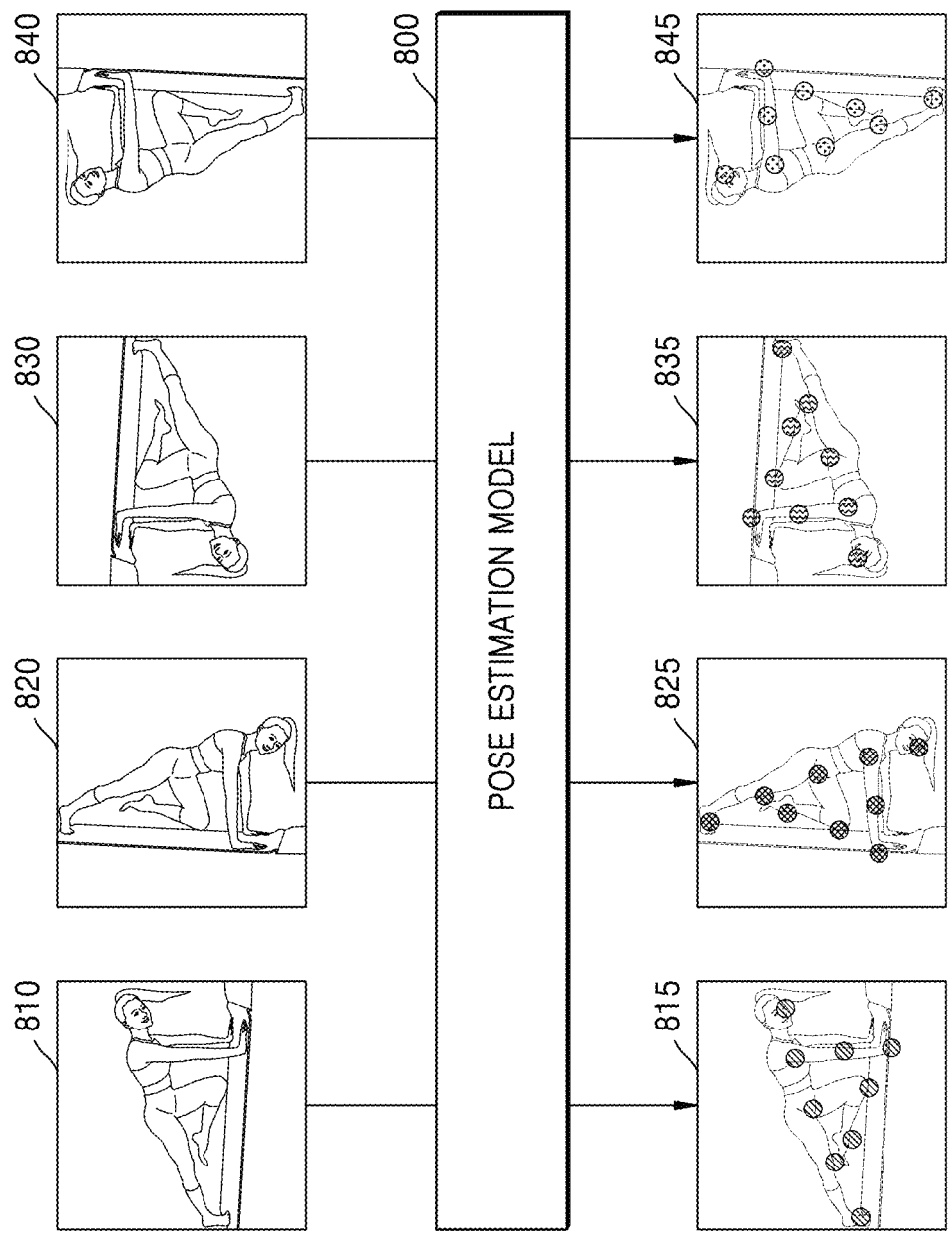
FIG. 8 is a view for describing an operation by which a server obtains first pose estimation results, according to an embodiment of the disclosure.

FIG. 8 is a view for describing an operation by which a server obtains first pose estimation results, according to an embodiment of the disclosure.

The server 2000 may obtain first pose estimation results, by applying a plurality of input images augmented from an original image to a pose estimation model 800. For example, referring to FIG. 8, the server 2000 may input a first image 810 to the pose estimation model 800, to obtain a first pose estimation result 815 of the first image 810. In the same manner, the server 2000 may input a second image 820, a third image 830, and a fourth image 840 to the pose estimation model 800, to obtain a first pose estimation result 825 of the second image 820, a first pose estimation result 835 of the third image 830, and a first pose estimation result 845 of the fourth image 840.

The server 2000 may apply weights determined through processes described with reference to FIG. 7 to the first pose estimation results 815, 825, 835, and 845. A method by which the server 2000 applies the weights to the first pose estimation results 815, 825, 835, and 845 will be described in more detail with reference to FIGS. 9 and 10A to 10C.

Figure 9:
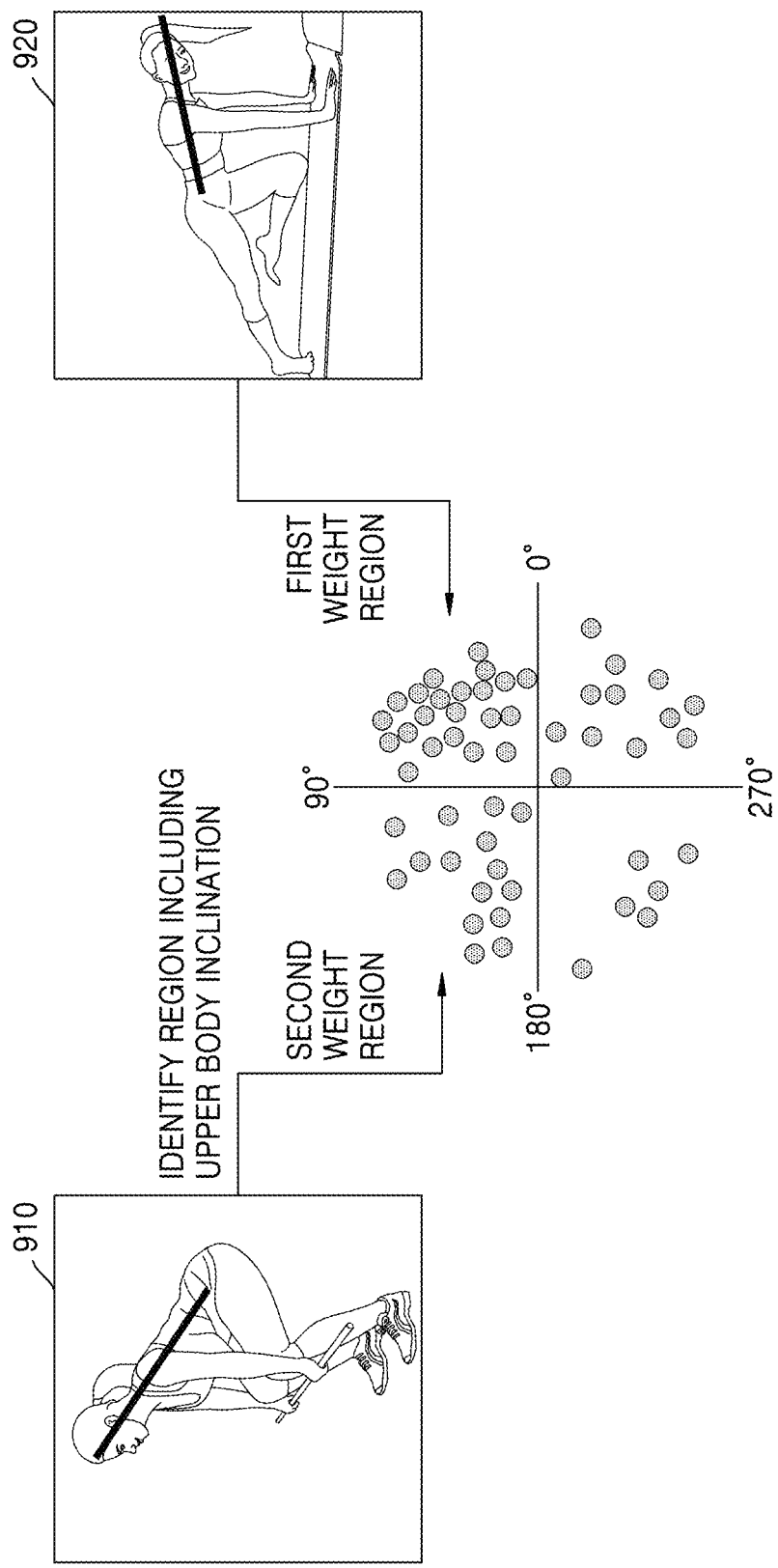
FIG. 9 is a view for describing an operation by which a server determines a weight corresponding to an image, according to an embodiment of the disclosure.

FIG. 9 is a view for describing an operation by which a server determines a weight corresponding to an image, according to an embodiment of the disclosure.

In an embodiment of the disclosure, the server 2000 may detect the head and pelvic joints of a person in an original image. The server 2000 may determine an upper body inclination of the person in the original image by connecting the detected head and pelvic joints, based on the head and pelvic joints.

For example, referring to FIG. 9, the server 2000 may detect the head and pelvic joints of a person in a first original image 910, and may identify an upper body inclination of the person in the first original image 910.

The server 2000 may identify a weight region including the upper body inclination of the person in the first original image 910. For example, because the upper body inclination of the person in the first original image 910 ranges from 90° to 180°, the first original image 910 is included in a second weight region. In this case, for the second weight region, a second weight may be determined according to the above embodiments of the disclosure. Accordingly, when the server 2000 obtains a first pose estimation result of the first original image 910 by applying the first original image 910 to a pose estimation model, the second weight may be applied to the first pose estimation result of the first original image 910.

In the same manner, because an upper body inclination of a person in a second original image 920 ranges from 0° to 90°, the second original image 920 is included in a first weight region. In this case, for the first weight region, a first weight may be determined according to the above embodiments of the disclosure. Accordingly, when the server 2000 obtains a first pose estimation result of the second original image 920 by applying the second original image 920 to the pose estimation model, the first weight may be applied to the first pose estimation result of the second original image 920.

Figure 10A:
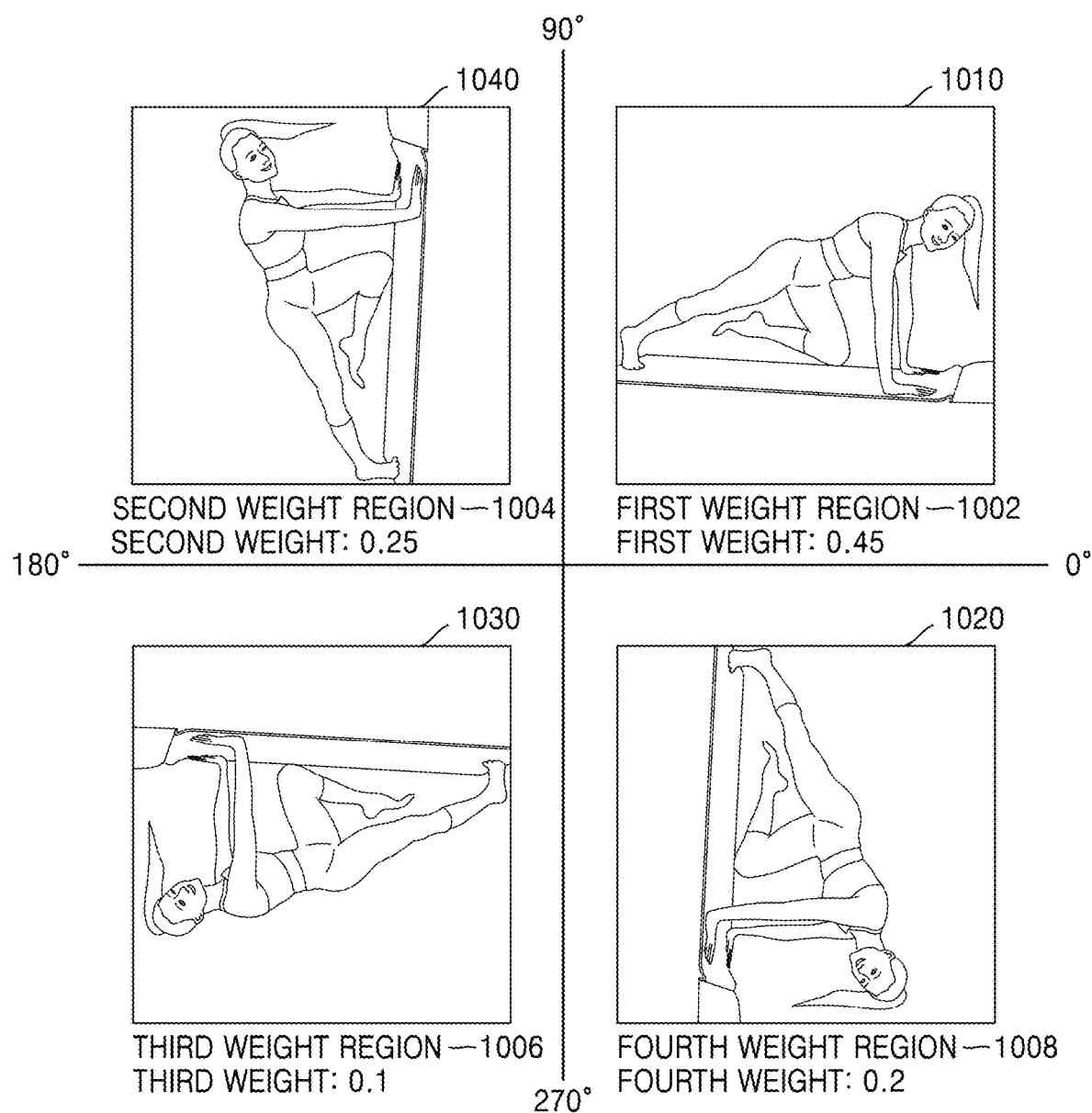
FIG. 10A is a view for describing an operation by which a server determines weights corresponding to a plurality of input images, according to an embodiment of the disclosure.

FIG. 10A is a view for describing an operation by which a server determines weights corresponding to a plurality of input images, according to an embodiment of the disclosure.

In an embodiment of the disclosure, the server 2000 may determine weights corresponding to a plurality of input images generated by augmenting an original image. In this case, the weights may respectively correspond to the plurality of input images. Also, the weights may be determined based on an upper body inclination distribution of people included in images of a training dataset used to train a pose estimation model.

In an embodiment of the disclosure, based on an upper body inclination of a person in the original image, the server 2000 may identify an upper body inclination of the person in each of the plurality of input images.

The plurality of input images generated by the server 2000 may include, for example, a first image 1010, a second image 1020, a third image 1030, and a fourth image 1040.

In an embodiment of the disclosure, the first image 1010 may be the original image, the second image 1020 may be an image obtained by rotating the original image clockwise by 90°, the third image 1030 may be an image obtained by rotating the original image clockwise by 180°, and the fourth image 1040 may be an image obtained by rotating the original image clockwise by 270°. Accordingly, the server 2000 may identify an upper body inclination of the person in each of the plurality of input images obtained by augmenting the original image based on an upper body inclination of the person in the original image. However, this is merely an example, and the server 2000 may identify the upper body inclination of the person in the image for each of the plurality of input images.

The server 2000 may identify a weight region including an upper body inclination of the person in each of the plurality of input images. For example, referring to FIG. 10A, because an upper body inclination of the person in the first image 1010 ranges from 0° to 90°, the first image 1010 is included in a first weight region 1002. In this case, for the first weight region 1002, a first weight determined according to the above embodiments of the disclosure may be 0.45. In the same example, because an upper body inclination of the person in the second image 1020 ranges from 270° to 360°, the second image 1020 is included in a fourth weight region 1008. In this case, for the fourth weight region 1008, a fourth weight determined according to the above embodiments of the disclosure may be 0.2. Also, because an upper body inclination of the person in the third image 1030 ranges from 180° to 270°, the third image 1030 is included in a third weight region 1006. In this case, for the third weight region 1006, a third weight determined according to the above embodiments of the disclosure may be 0.1. Also, because an upper body inclination of the person in the fourth image 1040 ranges from 90° to 180°, the fourth image 1040 is included in a second weight region 1004. In this case, for the second weight region 1004, a second weight determined according to the above embodiments of the disclosure may be 0.25.

Figure 10B:
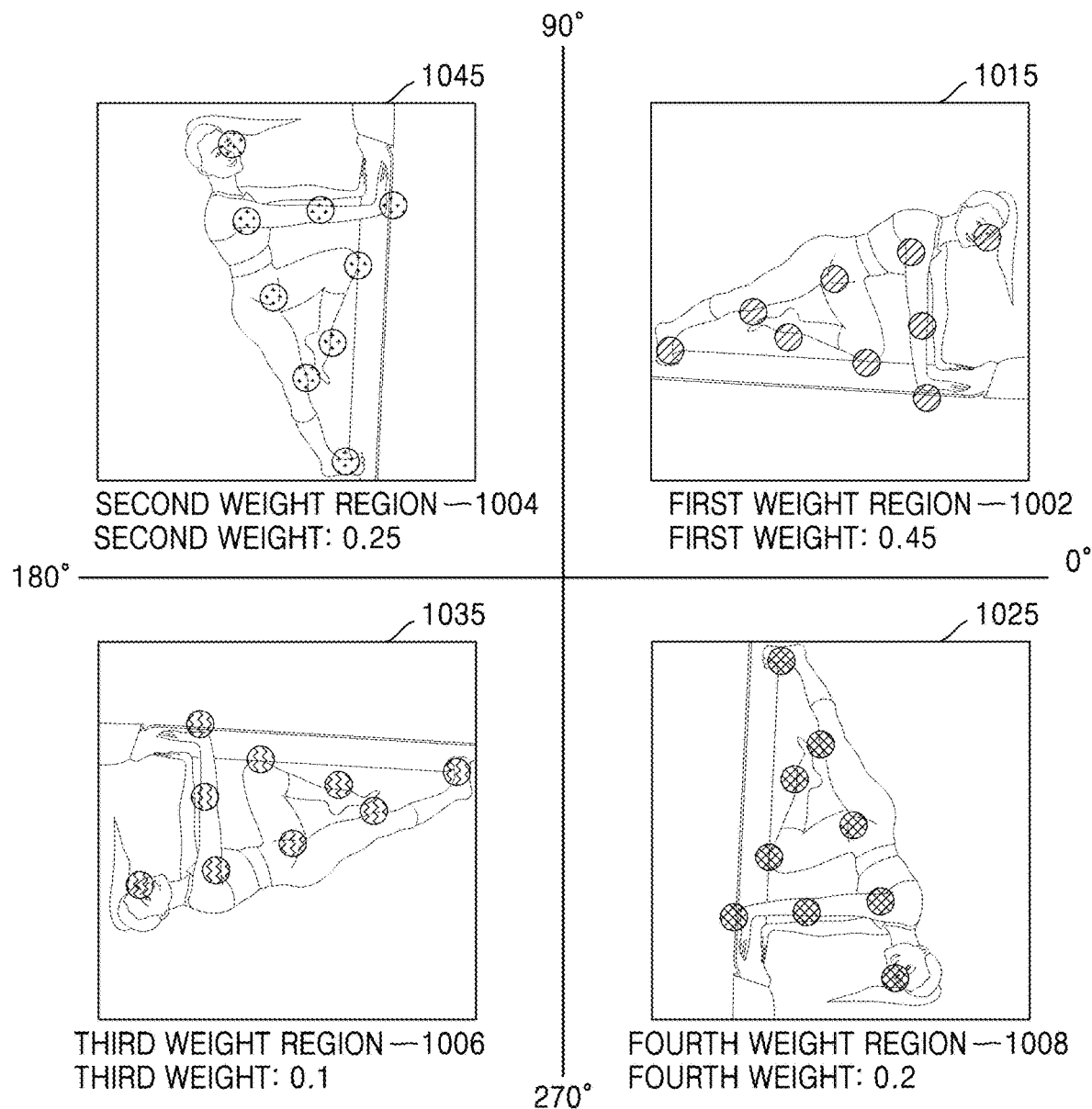
FIG. 10B is a view for describing weights corresponding to first pose estimation results of a plurality of input images, according to an embodiment of the disclosure.

FIG. 10B is a view for describing weights corresponding to first pose estimation results of a plurality of input images, according to an embodiment of the disclosure.

FIG. 10B illustrates first pose estimation results 1015, 1025, 1035, and 1045, obtained by the server 2000 by applying the first image through the fourth image 1010, 1020, 1030, and 1040 that are a plurality of input images of FIG. 10A to a pose estimation model.

Weights may respectively correspond to the first pose estimation results 1015, 1025, 1035, and 1035. For example, referring to FIG. 10B, because the upper body inclination of the person in the first image 1010 is included in the first weight region 1002, the first weight of '0.45' corresponds to the first pose estimation result 1015 of the first image 1010. Also, because the upper body inclination of the person in the second image 1020 is included in the fourth weight region 1008, the fourth weight of '0.2' corresponds to the first pose estimation result 1025 of the second image 1020. Also, because the upper body inclination of the person in the third image 1030 is included in the third weight region 1006, the third weight of '0.1' corresponds to the first pose estimation result 1035 of the third image 1030. Also, because the upper body inclination of the person in the fourth image 1040 is included in the second weight region 1004, the second weight of '0.25' corresponds to the first pose estimation result 1045 of the fourth image 1040.

FIG. 10C is a view for describing an operation by which a server applies weights to first pose estimation results of a plurality of input images, according to an embodiment of the disclosure.

In an embodiment of the disclosure, the server 2000 may reversely apply a data augmentation method applied by the server 2000 to generate the plurality of input images 1010, 1020, 1030, and 1040, to the first pose estimation results 1015, 1025, 1035, and 1045.

For example, referring to FIG. 10C, because the first image 1010 corresponds to an original image, the server 2000 may not change the first pose estimation result 1015 of the first image 1010. Also, because the second image 1020 is an image generated by rotating the original image clockwise by 90°, the server 2000 may rotate the first pose estimation result 1025 of the second image 1020 counterclockwise by 90°. In the same manner, the server 2000 may restore the first pose estimation results 1015, 1025, 1035, and 1045 to correspond to the original image, by rotating the first pose estimation result 1035 of the third image 1030 counterclockwise by 180° and rotating the first pose estimation result 1045 of the fourth image 1040 counterclockwise by 270°.

The server 2000 may apply weights to the first pose estimation results. For example, the server 2000 may apply a weight of 0.45 to the first pose estimation result 1015 of the first image 1010, may apply a weight of 0.2 to the first pose estimation result 1025 of the second image 1020, may apply a weight of 0.1 to the first pose estimation result 1035 of the third image 1030, and may apply a weight of 0.25 to the first pose estimation result 1045 of the fourth image 1040.

The server 2000 may obtain a second pose estimation result 1050, based on the first pose estimation results to which the weights are applied. In detail, the server 2000 may obtain the second pose estimation result, by adding the first pose estimation results to which the weights are applied.

The server 2000 according to an embodiment of the disclosure may generate a plurality of input images by augmenting an original image, may obtain first pose estimation results for the plurality of input images, and may obtain a second pose estimation result that is finally corrected by applying weights determined according to the above embodiments of the disclosure, to accurately estimate a pose of a person in the original image.

Figure 11:
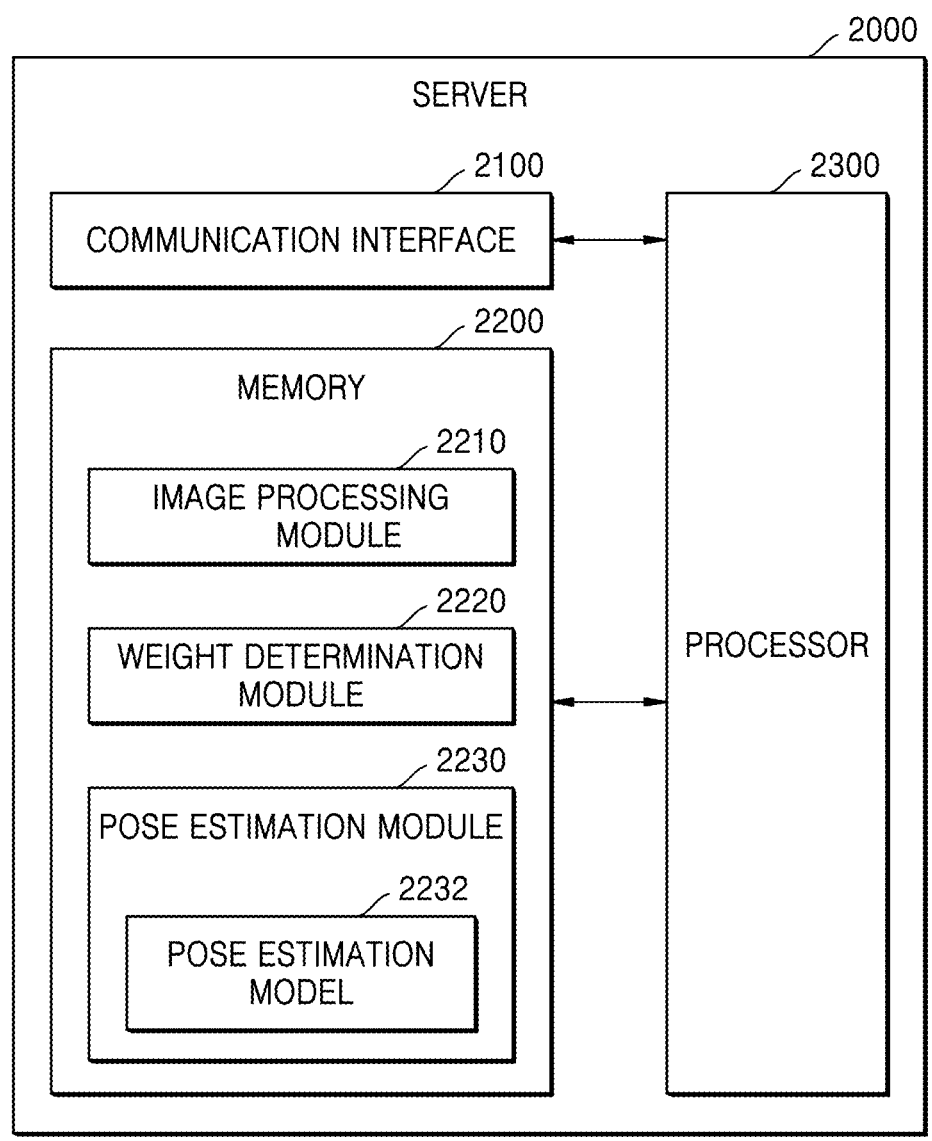
FIG. 11 is a block diagram illustrating a configuration of a server, according to an embodiment of the disclosure.

FIG. 11 is a block diagram illustrating a configuration of a server, according to an embodiment of the disclosure.

Referring to FIG. 11, the server 2000 according to an embodiment of the disclosure may include a communication interface 2100, a memory 2200, and a processor 2300.

The communication interface 2100 may perform data communication with other electronic devices under the control by the processor 2300.

The communication interface 2100 may perform data communication between the server 2000 and other electronic devices by using at least one of data communication methods including, for example, wired local area network (LAN), wireless LAN, Wi-Fi, Bluetooth, Zigbee, Wi-Fi Direct (WFD), infrared data association (IrDA), Bluetooth low energy (BLE), near-field communication (NFC), wireless broadband Internet (WiBro), world interoperability for microwave access (WiMAX), shared wireless access protocol (SWAP), wireless gigabit alliance (WiGig), and radio frequency (RF) communication.

The communication interface 2100 according to an embodiment of the disclosure may transmit and receive data for estimating a pose of a person to and from an external device. For example, the communication interface 2100 may receive a training dataset for training a pose estimation model from another electronic device, or may receive the pose estimation model, and an image and/or a video including a person from another electronic device. The communication interface 2100 may transmit an original image and a pose estimation result to another electronic device, to visually display the pose estimation result.

The memory 2200 may store instructions, a data structure, and program code readable by the processor 2300. In embodiments of the disclosure, operations performed by the processor 2300 may be performed by executing code or instructions of a program stored in the memory 2200.

Examples of the memory 2200 may include a nonvolatile memory including at least one of a flash memory type, a hard disk type, a multimedia card micro type, a card type memory (e.g., a secure digital (SD) or extreme digital (XD) memory), a read-only memory (ROM), an electrically erasable programmable read-only memory (EEPROM), a programmable read-only memory (PROM), a magnetic memory, a magnetic disk, or an optical disc and a volatile memory such as a random-access memory (RAM) or a static random-access memory (SRAM).

The memory 2200 according to an embodiment of the disclosure may store various types of data, instructions, and a program which may be used to estimate a pose of a person. For example, an image processing module 2210 for generating a plurality of input images, a weight determination module 2220 for determining weights to be applied to pose estimation results obtained from the plurality of input images, a pose estimation module 2230 for estimating a pose of a person in an image, and a pose estimation model 2232 may be stored in the memory 2200.

The processor 2300 may control overall operations of the server 2000. For example, the processor 2300 may control an overall operation of the server 2000 for estimating a pose of a person, by executing one or more instructions of a program stored in the memory 2200.

The processor 2300 may include at least one of, for example, but not limited to, a central processing unit, a microprocessor, a graphics processing unit, an application-specific integrated circuit (ASIC), a digital signal processor (DSP), a digital signal processing device (DSPD), a programmable logic device (PLD), a field-programmable gate array (FPGA), an application processor (AP), a neural processing unit, or a dedicated AI processor designed with a hardware structure specialized for processing an AI model.

In an embodiment of the disclosure, the processor 2300 may generate a plurality of input images by augmenting an original image, by using the image processing module 2210. The processor 2300 may generate a plurality of input images, by applying various augmentation methods such as image rotation, flip, and translation by using the image processing module 2210. Specific operations by which the processor 2300 augments an image have been described in the above embodiments of the disclosure, and thus, the same description will be omitted.

In an embodiment of the disclosure, the processor 2300 may determine weights to be applied to first pose estimation results, by using the weight determination module 2220. The processor 2300 may generate an upper body inclination distribution of people included in images of a training dataset used to train a pose estimation model, and may determine weights based on the generated upper body inclination distribution. Specific operations by which the processor 2300 determines weights have been described in the above embodiments of the disclosure, and thus, the same description will be omitted.

In an embodiment of the disclosure, the processor 2300 may estimate a pose of a person in an original image, by using the pose estimation module 2230 and the pose estimation model 2232. The processor 2300 may input the plurality of input images generated by the image processing module 2210 to the pose estimation model 2232, to obtain first pose estimation results respectively corresponding to the plurality of input images. The processor 2300 may identify an upper body inclination of a person in each of the plurality of input images, and may determine which weight from among the plurality of weights is to be applied to each of the first pose estimation results, based on the upper body inclination of the person in each of the plurality of input images. The processor 2300 may obtain a second pose estimation result, by applying and adding the weights to the first pose estimation results. Specific operations by which the processor 2300 estimates a pose of a person have been described in the above embodiments of the disclosure, and thus, the same description will be omitted.

Figure 12:
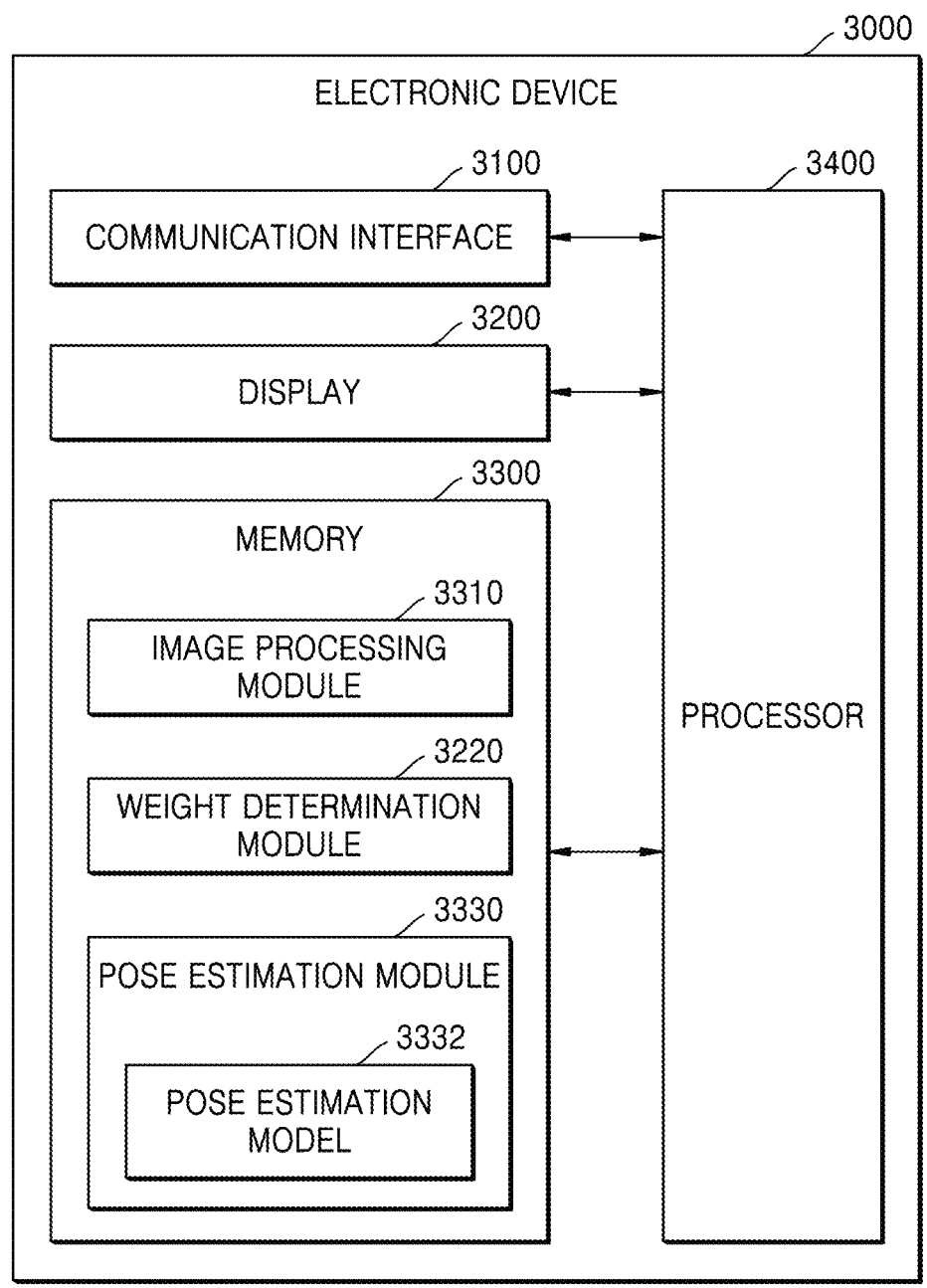
FIG. 12 is a block diagram illustrating a configuration of an electronic device, according to an embodiment of the disclosure.

FIG. 12 is a block diagram illustrating a configuration of an electronic device, according to an embodiment of the disclosure.

In an embodiment of the disclosure, operations by which the server 2000 estates a pose of a person may be performed by an electronic device 3000.

In an embodiment of the disclosure, examples of the electronic device 3000 may include, but are not limited to, a smartphone, a tablet personal computer (PC), a smart television (TV), a laptop, and a desktop.

Referring to FIG. 12, the electronic device 3000 may include a communication interface 3100, a display 3200, a memory 3300, and a processor 3400. The communication interface 3100, the memory 3300, and the processor 3400 of the electronic device 3000 respectively correspond to the communication interface 2100, the memory 2200, and the processor 2300 of the server 2000 of FIG. 11, and thus, the same description will be omitted. The memory 3300 includes an image processing module 3310, a weight determination module 3320, and pose estimation modules 3330 and 3332.

The display 3200 may output an image signal on a screen of the electronic device 3000 under the control by the processor 3400. The display may visually display a second pose estimation result.

The electronic device 3000 may further include a camera module (not shown). In this case, the electronic device 3000 may photograph a person by using the camera module, and may estimate a pose of the person in an image or a video according to the above embodiments of the disclosure.

In an embodiment of the disclosure, the electronic device 3000 generates a plurality of input images based on an original image, and the plurality of input images are obtained by changing a pose of a person in the original image in various ways (e.g., changing a position or an angle). Accordingly, even when the person is photographed in a state where the electronic device 3000 is rotated and thus a camera of the electronic device 3000 is also rotated, or when a photographing environment of the electronic device 3000 is changed (e.g., the electronic device 3000 is moved), because the electronic device 3000 generates a plurality of input images by augmenting an original image, a pose of a person in the original image may be accurately estimated.

The block diagrams of the server 2000 of FIG. 11 and the electronic device 3000 of FIG. 12 are block diagrams for an embodiment of the disclosure. Components of the block diagram may be integrated, added, or omitted according to a specification of each device that is actually implemented. That is, when necessary, two or more components may be combined into one component, or one component may be divided into two or more components. Also, a function performed in each block is intended to describe embodiments of the disclosure, and its detailed operations or devices do not limit the scope of the disclosure.

An operating method of the server 2000 according to an embodiment of the disclosure may be implemented as program commands executable by various computer means and may be recorded on a computer-readable medium. The computer-readable medium may include program commands, data files, data structures, and the like separately or in combinations. The program commands recorded on the computer-readable medium may be specially designed and configured for the disclosure or may be well-known to and be usable by one of ordinary skill in the art of computer software. Examples of the computer-readable medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a RAM, or a flash memory. Examples of the program commands include advanced language code that may be executed by a computer by using an interpreter or the like as well as machine language code made by a compiler. The computer-readable medium may be provided in the form of a non-transitory recording medium. Here, the 'non-transitory recording medium' only denotes a tangible device and does not contain a signal (for example, electromagnetic waves). This term does not distinguish a case where data is stored in the recording medium semi-permanently and a case where the data is stored in the recording medium temporarily. For example, the 'non-transitory storage medium' may include a buffer in which data is temporarily stored.

Also, an operating method of the server 2000 according to embodiments of the disclosure may be provided in a computer program product. The computer program product is a product purchasable between a seller and a purchaser.

The computer program product may include a software (S/W) program and a computer-readable storage medium in which the S/W program is stored. For example, the computer program product may include a product (e.g., a downloadable application) in the form of a S/W program electronically distributed through a manufacturer of the electronic device or an electronic market. For electronic distribution, at least a portion of the S/W program may be stored in a storage medium or temporarily generated. In this case, the storage medium may be a server of the manufacturer, a server of the electronic market, or a storage medium of a relay server that temporarily stores the S/W program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a server, of estimating a pose of a person, the method comprising:

obtaining an original image comprising a person;

generating a plurality of input images by rotating the original image, the plurality of input images comprising a first image which is the original image, a second image generated by rotating the original image clockwise by 90°, a third image generated by rotating the original image clockwise by 180°, and a fourth image generated by rotating the original image clockwise by 270°;

obtaining first pose estimation results respectively corresponding to the plurality of input images, by inputting the first through fourth images input images to a pose estimation model;

identifying an upper body inclination of the person in each of the first image through the fourth image;

applying a first weight through a fourth weight respectively corresponding to the upper body inclinations to the first pose estimation results; and obtaining a second pose estimation result, based on the weighted first pose estimation results, wherein the first pose estimation results and the second pose estimation result each comprise data indicating main body parts of the person.

2. The method of claim 1, further comprising:
transmitting the original image and the second pose estimation result to another electronic device, to visually display the original image and the second pose estimation result.

3. The method of claim 1, wherein the pose estimation model is trained by using a training dataset comprising images comprising annotations indicating key points of a body.

4. The method of claim 3, wherein the weights to be applied to the first pose estimation results are determined based on an upper body inclination distribution of people included in the images of the training dataset used to train the pose estimation model.

5. The method of claim 4, further comprising:
detecting head and pelvic joints of the person in the original image; and
determining an upper body inclination of the person in the original image, based on the head and the pelvic joints.

6. The method of claim 5, further comprising:
identifying an upper body inclination of the person in each of the plurality of input images, based on the upper body inclination of the person in the original image,
wherein the applying of the weights to the first pose estimation results comprises applying the weights to the first pose estimation results, based on the upper body inclination of the person in each of the plurality of input images, and
wherein the weights respectively correspond to the plurality of input images.

7. The method of claim 1, wherein a sum of the first weight through the fourth weight is 1.

8. A server for performing pose estimation of a person, the server comprising:
a communication interface;
a memory storing one or more instructions; and
a processor configured to execute the one or more instructions stored in the memory to:
obtain an original image comprising a person,
generate a plurality of input images by rotating the original image, the plurality of input images comprising a first image which is the original image, a second image generated by rotating the original image clockwise by 90°, a third image generated by rotating the original image clockwise by 180°, and a fourth image generated by rotating the original image clockwise by 270°, obtain first pose estimation results respectively corresponding to the plurality of input images, by inputting the of first through fourth images input images to a pose estimation model, identify an upper body inclination of the person in each of the first image through the fourth image, apply a first weight through a fourth weight respectively corresponding to the upper body inclinations to the first pose estimation results, and obtain a second pose estimation result, based on the weighted first pose estimation results, wherein the first pose estimation results and the second pose estimation result each comprise data indicating main body parts of the person.

9. The server of claim 8, wherein the processor is further configured to execute the one or more instructions to control the communication interface to transmit the original image and the second pose estimation result to another electronic device.

10. The server of claim 8, wherein the pose estimation model is trained by using a training dataset comprising images comprising annotations indicating key points of a body.

11. The server of claim 10, wherein the weights to be applied to the first pose estimation results are determined based on an upper body inclination distribution of people included in the images of the training dataset used to train the pose estimation model.

12. The server of claim 11, wherein the processor is further configured to execute the one or more instructions to:
detect head and pelvic joints of the person in the original image; and
determine an upper body inclination of the person in the original image, based on the head and the pelvic joints.

13. The server of claim 12, wherein the processor is further configured to execute the one or more instructions to:
identify an upper body inclination of the person in each of the plurality of input images, based on the upper body inclination of the person in the original image; and
apply the weights to the first pose estimation results, based on the upper body inclination of the person in each of the plurality of input images,
wherein the weights respectively correspond to the plurality of input images.

14. A non-transitory computer-readable recording medium having recorded thereon an executable program for instructing a computer to perform the following operations:
obtaining an original image comprising a person;
generating a plurality of input images by rotating the original image, the plurality of input images comprising a first image which is the original image, a second image generated by rotating the original image clockwise by 90°, a third image generated by rotating the original image clockwise by 180°, and a fourth image generated by rotating the original image clockwise by 270°;
obtaining first pose estimation results respectively corresponding to the plurality of input images, by inputting the first through fourth images input images to a pose estimation model;
identifying an upper body inclination of the person in each of the first image through the fourth image;

applying a first weight through a fourth weight respectively corresponding to the upper body inclinations to the first pose estimation results; and obtaining a second pose estimation result, based on the weighted first pose estimation results, wherein the first pose estimation results and the second pose estimation result each comprise data indicating main body parts of the person.

* * * * *